(12) United States Patent
Teske

(10) Patent No.: US 11,885,635 B2
(45) Date of Patent: Jan. 30, 2024

(54) DISPLAYING CHARGING OPTIONS FOR AN ELECTRIC VEHICLE

(71) Applicant: Matthew John Teske, Portland, OR (US)

(72) Inventor: Matthew John Teske, Portland, OR (US)

(73) Assignee: Chargeway Inc., Portland, OR (US)

( * ) Notice: Subject to any disclaimer, the term of this patent is extended or adjusted under 35 U.S.C. 154(b) by 0 days.

(21) Appl. No.: 17/852,244

(22) Filed: Jun. 28, 2022

(65) Prior Publication Data

US 2022/0404165 A1 Dec. 22, 2022

Related U.S. Application Data

(62) Division of application No. 16/440,888, filed on Jun. 13, 2019, now Pat. No. 11,391,597.

(60) Provisional application No. 62/686,536, filed on Jun. 18, 2018.

(51) Int. Cl.
*G01C 21/36* (2006.01)

(52) U.S. Cl.
CPC ..... *G01C 21/3676* (2013.01); *G01C 21/3697* (2013.01)

(58) Field of Classification Search
CPC ............ G01C 21/3676; G01C 21/3697; G01C 21/3889; G01C 21/3682; B60L 53/14; B60L 53/305; B60L 53/65; B60L 53/67; B60L 2240/62; B60L 2240/72; B60L 2240/80; B60L 2250/16; Y02T 10/72; Y04S 30/14; Y04S 30/12

See application file for complete search history.

(56) References Cited

U.S. PATENT DOCUMENTS

| | | | |
|---|---|---|---|
| 2011/0144823 A1 | 6/2011 | Muller et al. | |
| 2012/0109519 A1 | 5/2012 | Uyeki | |
| 2013/0151293 A1 | 6/2013 | Karner et al. | |
| 2014/0316939 A1* | 10/2014 | Uyeki | ...................... B60L 3/12 705/26.9 |

(Continued)

FOREIGN PATENT DOCUMENTS

JP 2012132817 A 7/2012

OTHER PUBLICATIONS

"ChargeMap Mobile App 2014", https://www.youtube.com/watch?v=5BmA3DUQMi0, Sep. 30, 2014.*

(Continued)

*Primary Examiner* — Brian P Sweeney
(74) *Attorney, Agent, or Firm* — Klarquist Sparkman, LLP

(57) ABSTRACT

Examples are provided for identifying charging options for charging an electric vehicle. In one method, the charging options may be identified by receiving a charging station query including one or more parameters, accessing a charging station database, the charging station database storing connector codes identifying a connector type and a connector power level for charging connectors provided at a plurality of charging stations, and comparing parameters of the charging station query to the connector codes of the charging station database to identify a first subset of the plurality of charging stations that fit the parameters of the charging station query. The method may also include transmitting mapping data for the first subset of the plurality of charging stations to a client device.

11 Claims, 16 Drawing Sheets

(56) References Cited

U.S. PATENT DOCUMENTS

| | | | |
|---|---|---|---|
| 2015/0045985 | A1 | 2/2015 | Yenamandra et al. |
| 2015/0095233 | A1 | 4/2015 | Wild et al. |
| 2022/0404164 | A1 | 12/2022 | Teske |

OTHER PUBLICATIONS

Support for Android App Drivearc, "DRIVEtheARC App Introduction", https://www.youtube.com/watch?v=D7L6vz_G7KY Mar. 9, 2018.*

International Search Report and Written Opinion, International Patent Application No. PCT/US2019/037540, dated Oct. 24, 2019, 13 pages.

International Preliminary Report on Patentability, International Patent Application No. PCT/US2019/037540, dated Dec. 22, 2020, 10 pages.

"ChargeMap Mobile app 2014," https://www.youtube.com/watch?y=5BmA3DUQMi0, 6 pages, Sep. 30, 2014.

Chargemap, "ChargeMap Mobile app 2014," https://www.youtube.com/watch?v=BmA3DUQMi0, 2 pages, Sep. 30, 2014.

Support for Android App Drivearc, "DRIVEtheARC App Introduction," https://www.youtube.com/watch?y=DZL6yz_G7kY, 2 pages, Mar. 9, 2018.

Robin Tv, "E-Autos an jeder Ladestation aufladen—New Motion App für alle Anbieter #ElekTricks—RobinTV," https://www.youtube.com/watch?v=NzcrsM0f1MU, 2 pages, Aug. 28, 2017.

Kotter et al., North Sea Region Electric Mobility Network, e-mobility NSR, "A review of electric vehicle charge point map websites in the NSR: Interim report," 22 pages, Jun. 2013 (retrieved Jun. 17, 2021).

European Search Report, EPC Application No. 19821808.3, 10 pages, dated Feb. 25, 2022.

Lilley et al., "A review of electric vehicle charge point map websites in the NSR Interim Report," The North Sea Region Electric Mobility Network Interim Report, The European Regional Development Fund, Jun. 2013 (22 pages).

"ChargeMap Mobile app 2014" YouTube Webpage DOI:https://www.youtube.com/watch?v=5BmA3DUQMi0, Sep. 30, 2014 (2 pages).

"E-Autos an jeder Ladestation aufladen—New Motion App für alle Anbieter #ElekTricks—RobinTV," YouTube DOI: https://www.youtube.com/watch?v=NzerN0FlMU, Aug. 28, 2017 (2 pages).

"DRIVEtheARC App Introduction," YouTube DOI:https://www.youtube.com/watch?v=D7L6vz_G7KY, Mar. 9, 2018 (2 pages).

Official Action, European Patent Application No. 19821808.3, dated Jun. 19, 2023, 10 pages.

First Examination Report, Indian Patent Application No. 202117002196, dated Jan. 30, 2023, 5 pages.

* cited by examiner

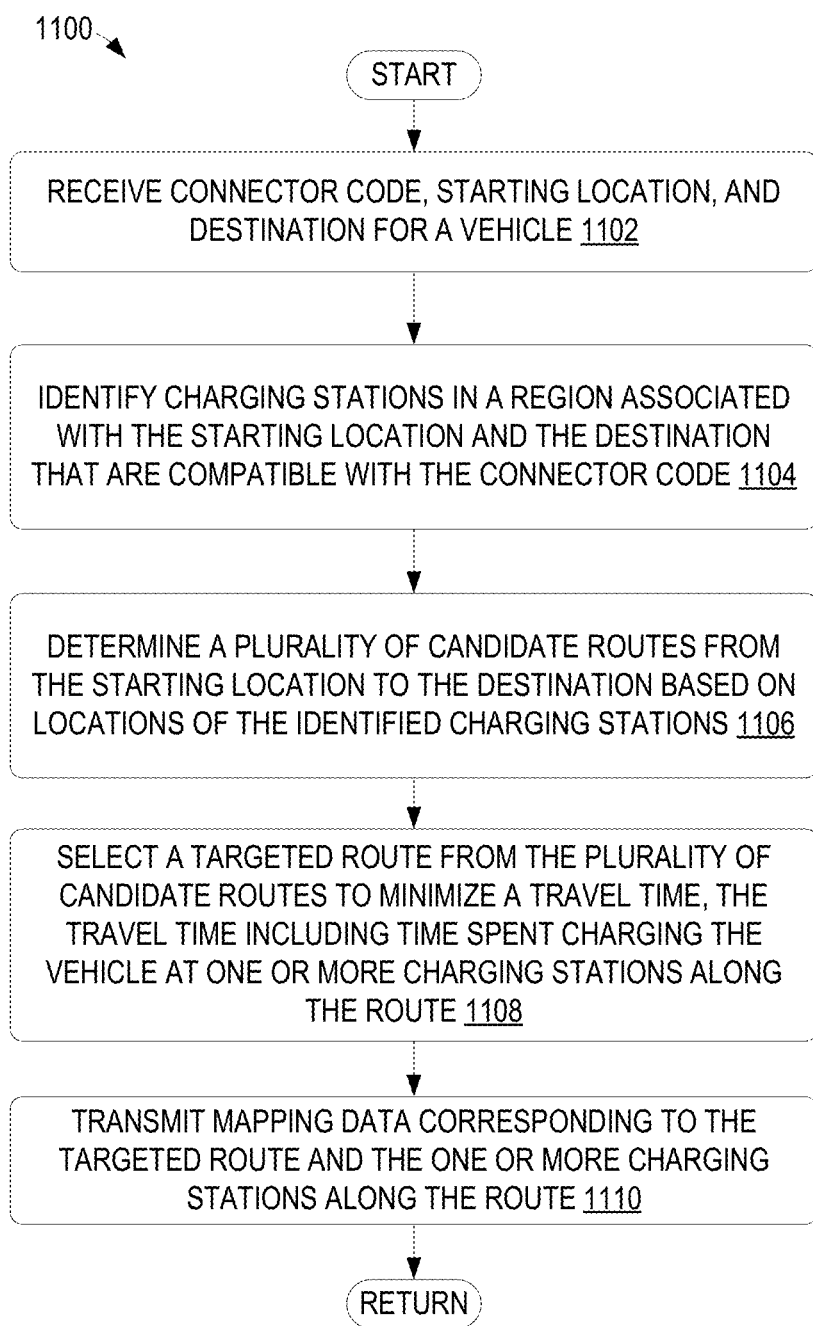

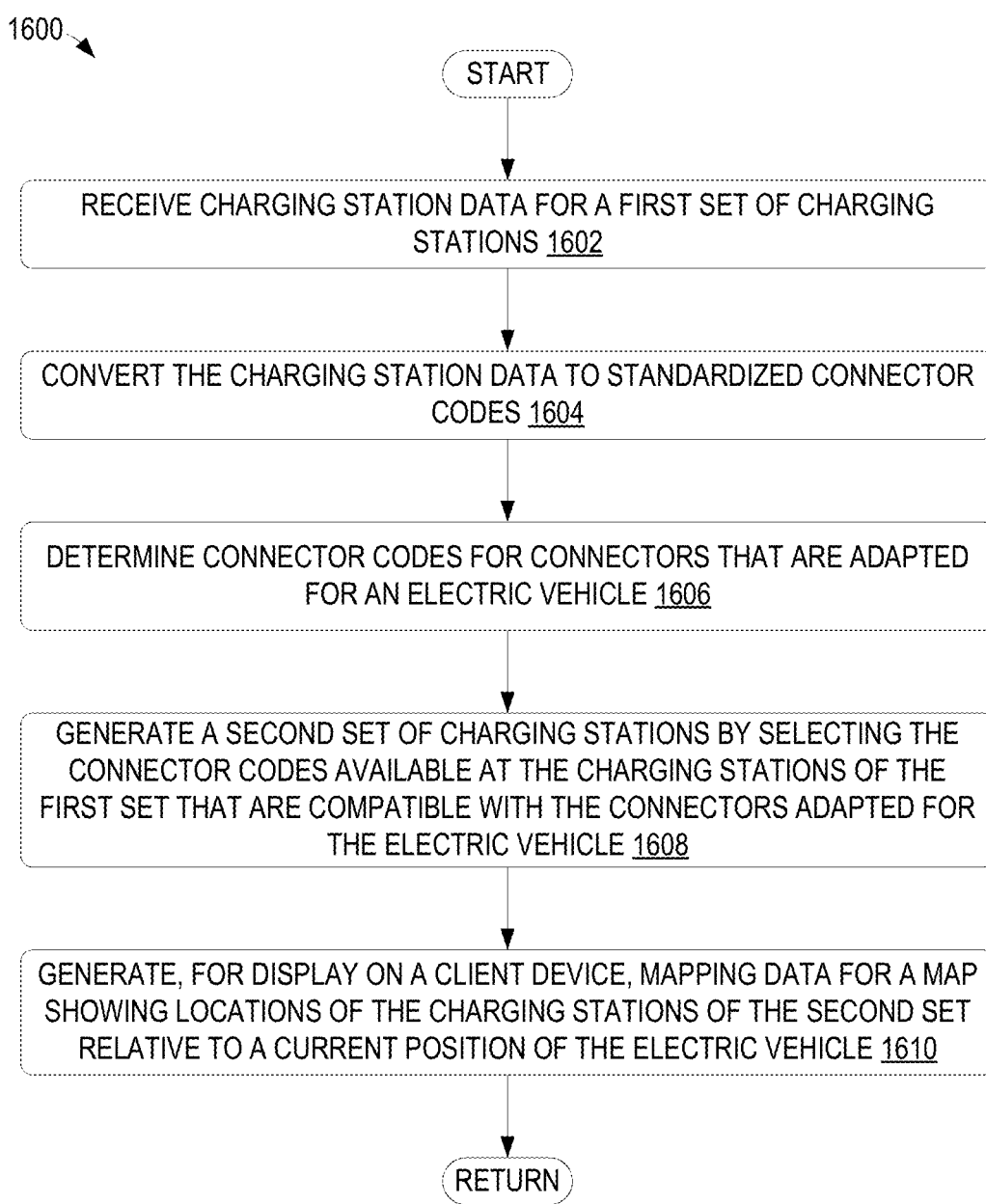

DISPLAYING CHARGING OPTIONS FOR AN ELECTRIC VEHICLE

CROSS REFERENCE TO RELATED APPLICATIONS

This application is a divisional application of U.S. patent application Ser. No. 16/440,888, filed Jun. 13, 2019, which claims priority from U.S. Provisional Application No. 62/686,536, filed Jun. 18, 2018, which applications are incorporated by reference herein in their entirety.

BACKGROUND

Electric vehicles occupy an increasing percentage of the automotive landscape, a landscape that historically has been dominated by vehicles having internal combustion engines that are powered by refined fossil fuels (e.g., gasoline). As a result, fuel for vehicles with internal combustion engines is widely available at gas stations that may provide a familiar fueling experience for users. For example, while different types of fuel (e.g., gasoline, which is available in different octane ratings, diesel, bio-diesel, ethanol, which is available in different concentrations, etc.) may be provided at gas stations, the fuels can be dispensed in a similar manner at a similar rate to one another (e.g., using a fluid pumping mechanism). Electric vehicles, by contrast, are powered by electrical energy supplied by an energy storage unit, which may be recharged via an electrical connection to an electrical energy source. Charging stations may provide an electrical energy source for recharging an electric vehicle, however, as electric vehicles are equipped with varying types of charging ports, a given charging station may only be compatible with (e.g., able to connect to) selected electric vehicles (e.g., via connectors adapted for the selected electric vehicles). Furthermore, charging stations may provide electrical energy at different power levels, which has a substantial effect on charging speed. For example, fully charging (e.g., "refueling") an electric vehicle may take anywhere from several minutes to multiple days, depending on charging capacity and capabilities of the vehicle and charging power level of the station.

In order to understand charging options available for an electric vehicle, a user may currently research technical information for the electric vehicle, such as a connector type and power level for a charging system of the electric vehicle, which may be provided in a form that is difficult to remember and understand in a practical context (e.g., a technical model name/number for the connector type and a kilowatt value for the power level). The user may then access information from multiple charging networks using separate queries for each network and attempt to coordinate resulting charging station information with the technical charging information for the electric vehicle in order to identify charging stations are compatible with the electric vehicle. However, depending on the information provided by the charging networks, the user may not be able to definitively identify all compatible charging stations using the available information. Determining a charging time for recharging the electric vehicle presents additional difficulties, as the user may separately perform calculations or access another information source using the charging capabilities of the electric vehicle and a charging station of interest in an attempt to estimate the charging time. Still further complications may arise when arriving at a selected charging station, as the user may once again attempt to coordinate technical charging information for the electric vehicle with non-uniform indicia on charging bays of the charging station in order to determine which charging bay(s) provide a targeted charging connector and power level.

SUMMARY

The disclosed systems and methods improve an electric vehicle experience for a user by developing and implementing a unifying communication language for describing charging parameters for vehicles and electrical charging stations. For example, connector codes using a standardized coding system (e.g., using colors and numbers) to identify charging connector types, power levels, and counts at charging stations may provide a user-friendly visual identity for electric vehicle charging options, thereby increasing user understanding of how an electric vehicle may be charged and decreasing a computational load for servicing charging station-related queries.

An example method for identifying charging options for charging an electric vehicle includes receiving a charging station query including one or more parameters. The parameters may be used to determine one or more associated standardized connector codes by: accessing a charging station database, the charging station database storing connector codes identifying a connector type and a connector power level for charging connectors provided at a plurality of charging stations, and comparing parameters of the charging station query to the connector codes of the charging station database to identify charging stations that fit the parameters of the charging station query. The results of the charging station query may be output by transmitting mapping data for the charging stations to a requesting device (e.g., a client device).

The foregoing and other objects, features, and advantages of the invention will become more apparent from the following detailed description, which proceeds with reference to the accompanying figures.

BRIEF DESCRIPTION OF THE DRAWINGS

FIG. 11 is a flow chart illustrating an example method for servicing a trip planning query using standardized connector codes to identify a route including charging stations that fit parameters of the trip planning query.

FIG. 16 is a flow chart illustrating an example method for identifying charging options for an electric vehicle.

DETAILED DESCRIPTION

The disclosure includes mechanisms for improving a recharging experience for electric vehicles by providing a standardized identity for charging plug (e.g., connector) and speed options used in the electric vehicle industry. The standardized identity provides a user-friendly representation of charging connectors that unifies disparate electric vehicle and charging station manufacturer nomenclature and provides technical information in a more easily recognizable and memorable format. For example, as will be discussed in more detail below, the standardized identity may include providing a color representation of a connector type for an electrical charging connection (e.g., of an electric vehicle and/or a charging station) and a numerical representation of a power level for the electrical charging connection. In this way, technical details for a charging connector of an electric vehicle, such as "J1772 type connector at an 11.5 kW power level," may be represented by a more user-friendly "Green 2" identifier, where the color green represents the J1772 type connector and the number 2 represents a power level range that includes 11.5 kW. With the disclosed standardized system, disparate individual charging connections may be distilled into groups, which reduces the overall number of identifiers to track. In this way, the standardized system may enable more efficient servicing of charging station queries, such as requests to locate nearby charging stations that are compatible with their electric vehicles, requests for charging times to charge an electric vehicle battery at various charging stations, and requests for routes that include enough charging station options to allow the electric vehicle to reach a destination without running out of battery charge. Further details regarding the above-described charging connector standardization and related operations are described below with reference to FIGS. 1-14.

As used herein, the term "electric vehicle" may refer to any vehicle that is capable of receiving input from an electrical energy source (e.g., a charging station) to charge a battery or other energy storage unit of the vehicle. The vehicles described herein may include fully electric vehicles (e.g., vehicles that are solely driven via an electric motor and/or otherwise powered solely by electrical energy) and/or hybrid electric vehicles (e.g., vehicles that include both an electrically-driven component, such as an electric motor, and a component driven by another energy source, such as a gasoline engine).

Figure 1:
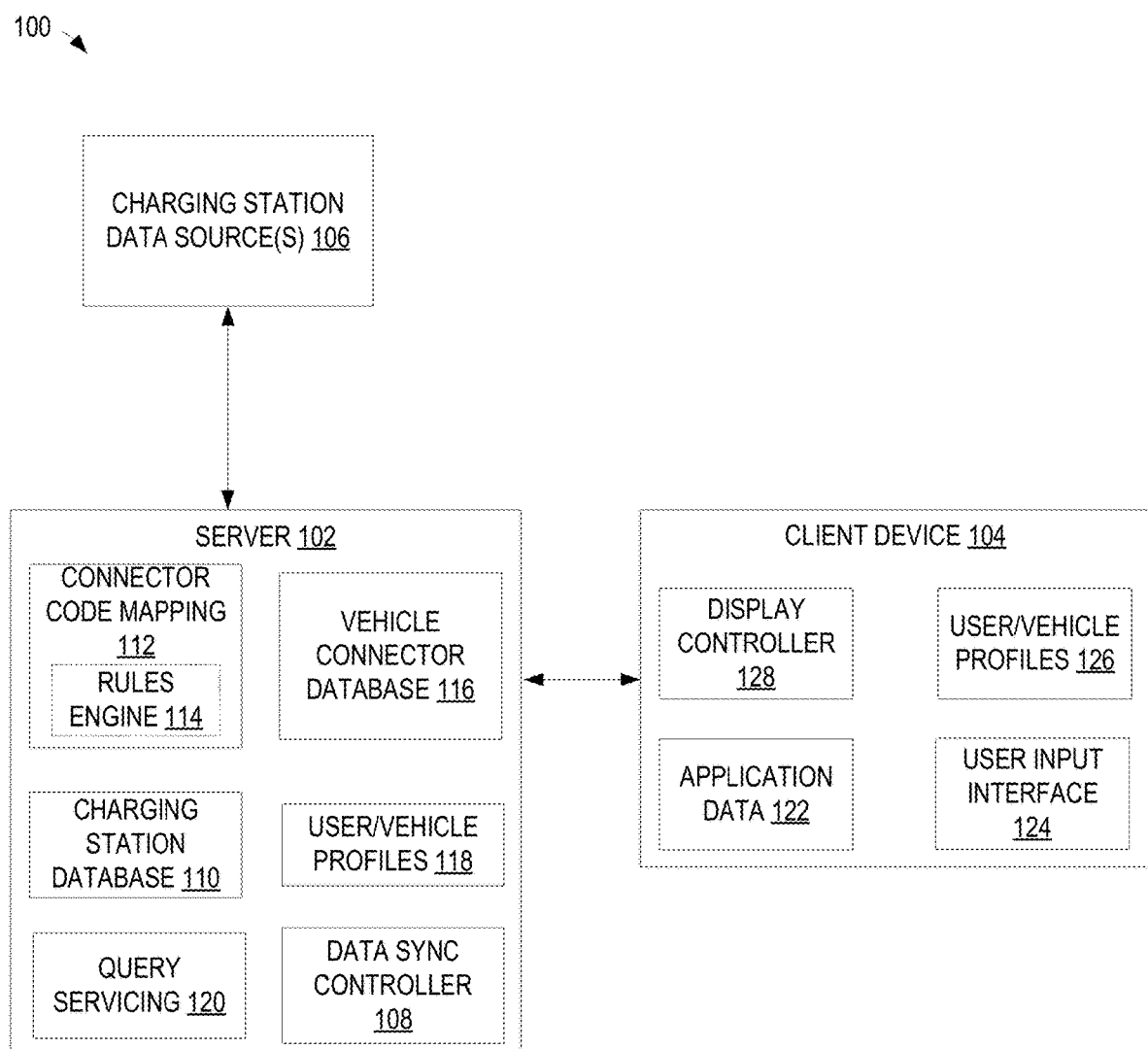
FIG. 1 is a block diagram illustrating an example system for receiving and processing queries relating to charging stations for electric vehicles.

FIG. 1 shows an example block diagram of a system 100 for receiving and processing queries associated with charging stations. The system 100 includes a server 102, a client device 104, and one or more charging station data sources 106. The server 102 includes a data synchronization controller 108, which controls the receipt of data from the charging station data sources 106. For example, the data synchronization controller 108 may control a hardware communication interface of the server to request or otherwise retrieve data from the charging station data sources 106 at regular intervals (e.g., once a day) and/or responsive to one or more triggers indicating a change in charging station data (e.g., receipt of an indication that a charging station has been added/removed from a charging station network). The data synchronization controller 108 may include instructions stored on a storage device of the server 102 that are executable by a processor of the server 102 to perform the data acquisition control as described herein. The charging station data sources 106 may include computing systems and/or storage devices associated with a charging station, a charging station network, a charging station data aggregation service (e.g., an aggregated database, such as a centralized database managed by a governmental entity and/or a database of charging station information entered directly by users of the charging stations), etc. The charging station data received from the charging station data sources 106 may be stored in a charging station database 110 of the server 102. For example, the charging station database 110 may store, at a storage device of the server 102, identifiers of charging stations and associated data received from the charging station data sources 106, such as geolocation, charging network affiliation, charging connector types, charging power levels, etc.

The server 102 further includes a connector code mapping unit 112 configured to convert the data from the charging station data sources into a standardized format based on a rules engine 114 that provides constraints and/or associations for deriving a standardized code for connectors and a quantity of connectors at a selected charging station. For example, the connector code mapping unit 112 may include instructions stored in a storage device of the server 102 that are executable by a processor of the server 102 to map a connector type and a connector power level of a given charging connector to a standardized connector code. The standardized connector code may include an identifier in a first standardized system (e.g., a standardized graphical appearance system, such as a standardized color system) that represents a connector type or group of connector types and an identifier in a second standardized system (e.g., a standardized numbering system) that represents a power level or a group of power levels. Examples of standardized connector code mapping are described below with respect to FIG. 4.

The connector code mapping unit 112 may determine connector codes for charging connectors at charging stations and/or charging connectors on electric vehicles. Accordingly, the determined connector codes may be used to update the charging station database 110 or a vehicle connector database 116, respectively. For example, when used to update the charging station database 110, the instructions of the connector code mapping unit 112 may also be executable to determine, for each of a plurality of charging stations, one or more charging connector counts that identify the number of charging connectors associated with a given connector code at that charging station. The connector codes and connector counts for each charging station may be stored in the charging station database 110, in addition to and/or as a replacement for all or some of the data retrieved from the charging station data sources 106. Further details regarding the generation and management of the charging station database are described below with respect to FIG. 3.

When used to update the vehicle connector database 116, the instructions of the connector code mapping unit 112 may be executed to determine, for each of a plurality of electric vehicles, a connector code associated with the charging system of that electric vehicle. The determined connector codes may be stored in the vehicle connector database 116 in association with an identifier of a vehicle make/model and/or a particular vehicle identifier (e.g., a Vehicle Identification Number [VIN] for a particular vehicle). In this way, the vehicle connector database 116 may be used as a lookup table for a connector code associated with a type of vehicle and/or a particular vehicle (e.g., avoiding a repetition of the connector code mapping processing in order to conserve processing resources/reduce processing delays).

The server 102 may optionally also include a database of user/vehicle profiles 118. For example, user profiles may include user information such as user preferences, user device information (e.g., type of device(s) used by the user), and/or historical user data (e.g., historical location information for the user, prior queries made by the user, user habits/behaviors, etc.), as well as vehicle information for vehicles associated with a user (e.g., vehicle make/model/connector code, etc.).

A query servicing unit 120 is included in the server 102 to process charging station queries from the client device 104. For example, the query servicing unit 120 may include instructions executable by a processor of the server 102 to receive a charging station query including query parameters and compare the query parameters to connector codes of the charging station database in order to determine charging stations that fit the query parameters. In order to perform the comparison, the query servicing unit 120 may be configured to perform additional processing based on the type of query received. For example, if the query is provided as a natural language input, the query servicing unit 120 may be configured to parse the query (or send the query for off-board parsing) in order to identify and extract the query parameters from the natural language input. Query parameters may include parameters such as one or more targeted connector codes, one or more locations, one or more charging networks, a connector count per targeted connector code, a threshold distance from a selected location/route, a targeted charging time/amount/level (e.g., which may be expressed as a percentage of a capacity of an energy storage device of the vehicle), and/or other parameters. The query parameters may be provided directly via the charging query and/or derivable based on information in the charging query. In examples where the query does not include an indication of a targeted connector code, the query servicing unit 120 may be configured to identify one or more connector codes of interest based on other information from the query. For example, the query servicing unit 120 may be configured to access the user/vehicle profiles database 118 to determine a selected vehicle that is most likely associated with a user providing the query and an associated connector code for the selected vehicle (e.g., based on further information stored in the user/vehicle profiles database 118 and/or information stored in the vehicle connector database 116 that matches the selected vehicle and/or a make/model of the selected vehicle). The instructions of the query servicing unit 120 may be further executable to identify mapping data for the charging stations that fit the query parameters and transmit the mapping data to the client device 104 as a query response.

The client device 104 includes application data 122, which may include instructions stored at the client device that are executable by a processor of the client device to perform operations associated with one or more applications. The one or more applications includes a charging station application for providing information regarding charging stations (e.g., an application for interacting with the server 102 to service charging station queries). For example, the client device may receive, at a user input interface 124, user input corresponding to a charging station query. The charging station query may be provided to the user input interface 124 in any suitable form (e.g., as voice input, gesture input, keyboard entry, actuation of a user interface control via input provided to a touch sensor, mouse, controller, and/or button, etc.). The charging station application may coordinate the transmission of the charging station query to the server 102 for processing. In some examples, the application sends raw input data directly to the server 102 without processing the input data. In other examples, the application may perform some processing on the input data (e.g., to convert the input data into a format recognizable by the server 102).

The charging station application may also generate and manage a user/vehicle profiles database 126 using information received from the user input interface (e.g., user entry of preferences/user information), the server 102 (e.g., output from prior charging station queries), and/or other devices and/or sensors included in or in communication with the client device 104 (e.g., global positioning system [GPS] sensors, server devices for social networks, vehicle sensors for a vehicle associated with the user, etc.). For example, the above-described information used to generate and manage the user/vehicle profiles database 126 may be aggregated and stored in association with a respective user and/or vehicle identifier. The charging station application may coordinate the sending of data from the user/vehicle profiles database 126 to the server and/or to an intermediary location (e.g., automatically, such as to supplement a charging station query and/or responsive to a request from the server 102, and/or manually, such as in response to a request from a user to transmit the data). It is to be understood that, while shown as being included in the client device 104 or the server 102, respectively, storage elements such as the user/vehicle profiles database 118 and 126, the vehicle connector database 116, and the charging station database 110 may be included in a remote storage unit that is accessible by the client device and/or server without departing from the scope of this disclosure.

As described above, the server 102 may transmit an output of the query servicing unit 120 to the client device 104. The output of the query servicing unit 120 may be processed by the charging station application of the client device in order to generate a map (e.g., in the case where the output corresponds to a list of geolocations of charging stations) or other displayable content and/or to otherwise prepare the output for presentation to a user of the client device 104 (e.g., via a display, speaker, and/or other output mechanism of the client device 104). In examples where the output (e.g., the query response) from the server 102 is processed by the application of the client device 104 for display, the application may generate display instructions that are provided to a display controller 128 of the client device 104 in order to control a display of the client device 104 and/or a display communicatively coupled to the client device 104 (e.g., a display in a vehicle console, an external monitor, a display of a different client device, etc.) to output a graphical indication of the query response from the server 102.

The client device 104 illustrated in FIG. 1 may include an end user device, such as a device to which a user directly provides input (e.g., requesting charging station queries, setting user preferences, inputting user/vehicle information, etc.) and which includes or is directly connected to an output device that presents information (e.g., a result of a charging station query, a user interface for an application that interfaces with the server 102, etc.) to the user. Examples of such end user devices include mobile devices (e.g., smartphones, tablets, laptops, etc.), personal computing devices (e.g., desktop computers), vehicle-based computing devices (e.g., infotainment systems, navigation systems, and/or other computing devices of a vehicle), etc. In other examples, however, the term "client device" may be used herein to refer to an intermediary device that provides output to an end user device. For example, the server 102 may receive charging station queries from and/or send charging station query results to an intermediary device, such as a computing system that provides an application programming interface (API) to enable the results of the queries to be presented in a web page, that is in turn accessed via a browser or other application of an end user device.

Figure 2:
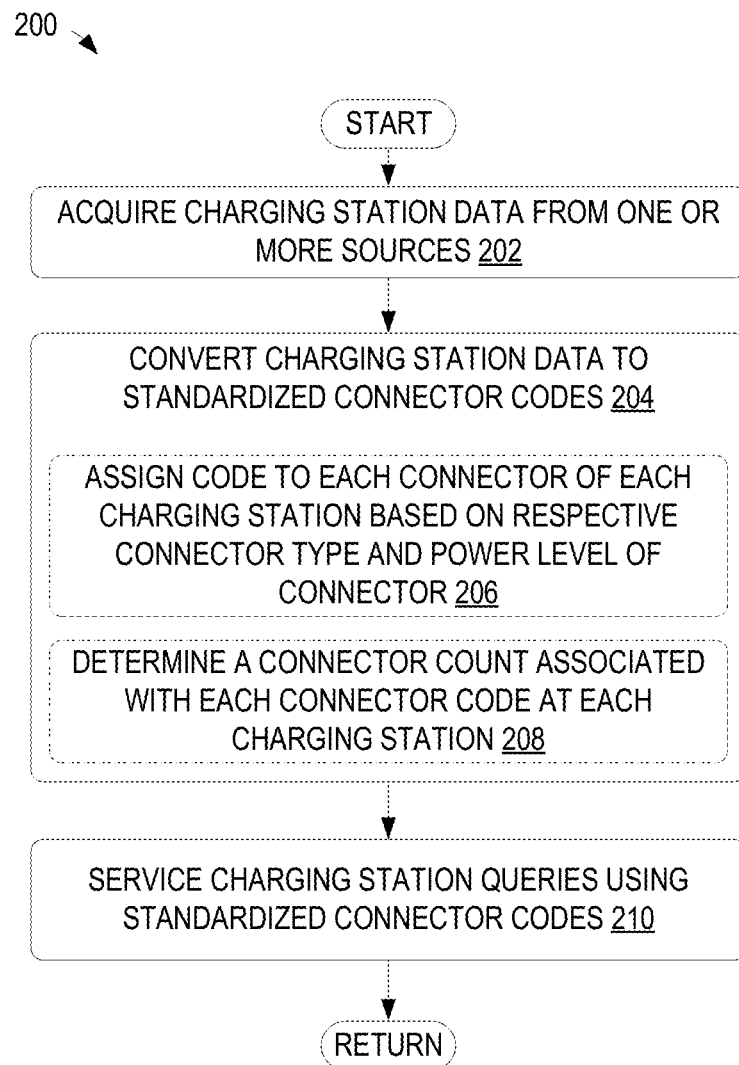
FIG. 2 is a flow chart illustrating an example method for receiving and processing queries relating to charging stations for electric vehicles.

FIG. 2 shows an example method 200 for determining charging options for a user. Method 200 may be performed by a server computing system, such as server 102 of FIG. 1, and generally represents a high-level overview of operations performed at the server. At 202, the method includes acquiring charging station data from one or more sources. For example, the one or more sources may include a charging station data aggregation source, such as the governmental database managed by the National Renewable Energy Laboratory (NREL), which collects information from multiple charging stations. The one or more sources may also include databases managed by one or more charging networks (e.g., owners of one or more charging stations), information from users of one or more charging stations (e.g., reports from the users regarding charging options available at the charging stations), and/or other data sources.

At 204, the method includes converting the charging station data to standardized connector codes. As indicated at 206, the conversion may include assigning a code to each connector of each charging station based on a respective connector type and power level of the connector, as described in more detail with respect to FIGS. 3 and 4. A standardization of the charging station data may further include determining a connector count (e.g., a number of connectors) associated with each connector code at each charging station, as indicated at 208. At 210, the method includes servicing charging station queries using the standardized connector codes (e.g., using the standardized connector codes as search keys). Using the standardized data, the server may provide responses to charging station queries that are less computationally complex to derive (thereby reducing computing resource usage and processing delays) and more user friendly than query servicing operations that utilize the original charging station data. More details regarding servicing charging station inquiries are provided below with respect to FIG. 5.

Figure 3:
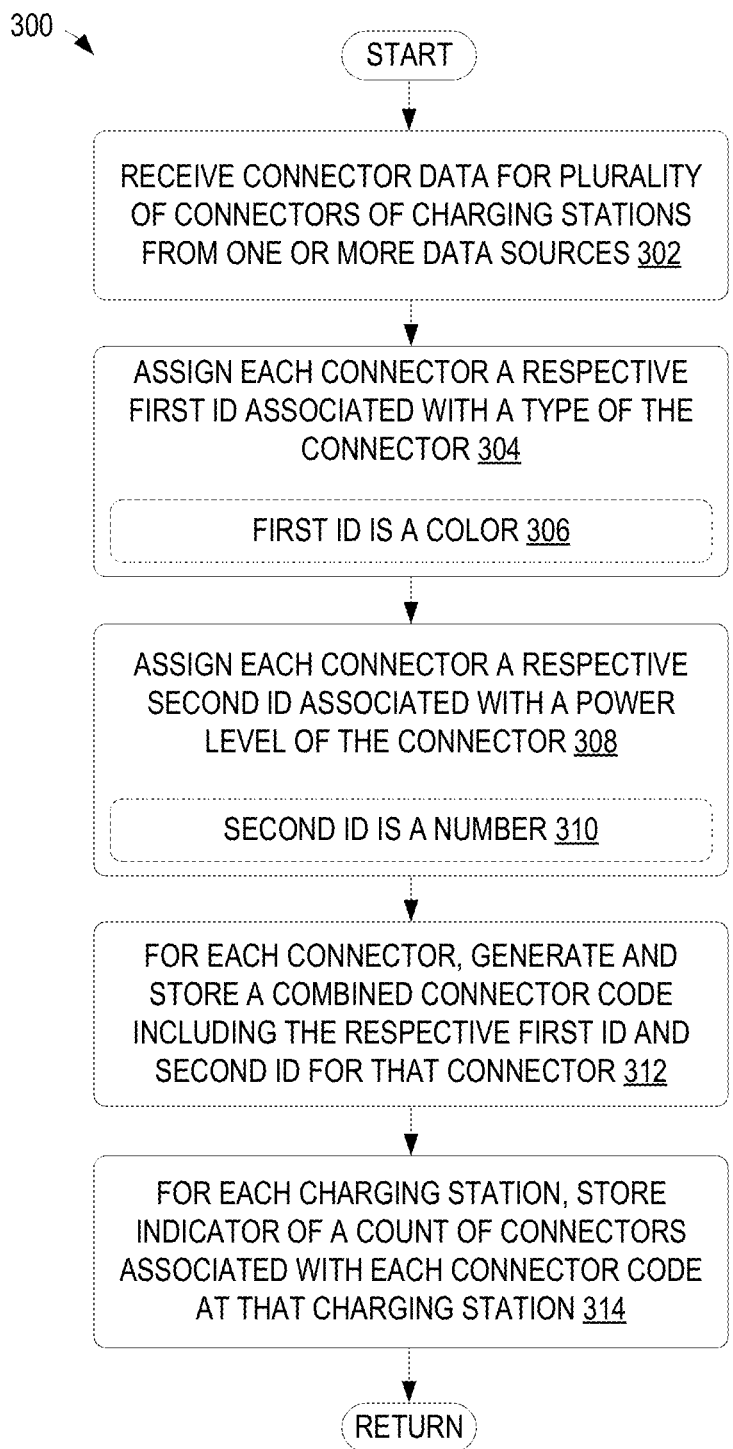
FIG. 3 is a flow chart illustrating an example method for generating a database of charging stations and associated standardized connector codes.

FIG. 3 shows an example method 300 for building and/or managing a charging station database. For example, method 300 may be performed by a server (e.g., server 102 of FIG. 1) and the charging station database may be stored at the server (e.g., as charging station database 110 in FIG. 1), at a client device, and/or at a remote location that is communicatively connected to the server and/or client device. At 302, the method includes receiving, from one or more data sources, connector data for a plurality of connectors of charging stations. The receipt of connector data may include retrieving the data from one or more of the various data sources described above with respect to the data acquisition performed at 202 of method 200 of FIG. 2. The connector data may be received at regular intervals (e.g., once a day) and/or responsive to a trigger, such as an indication of a change in data at the one or more data sources. In some examples, method 300 may be performed responsive to an initiation of the collection of connector data (e.g., based on a scheduled timing and/or other trigger).

Figure 4:
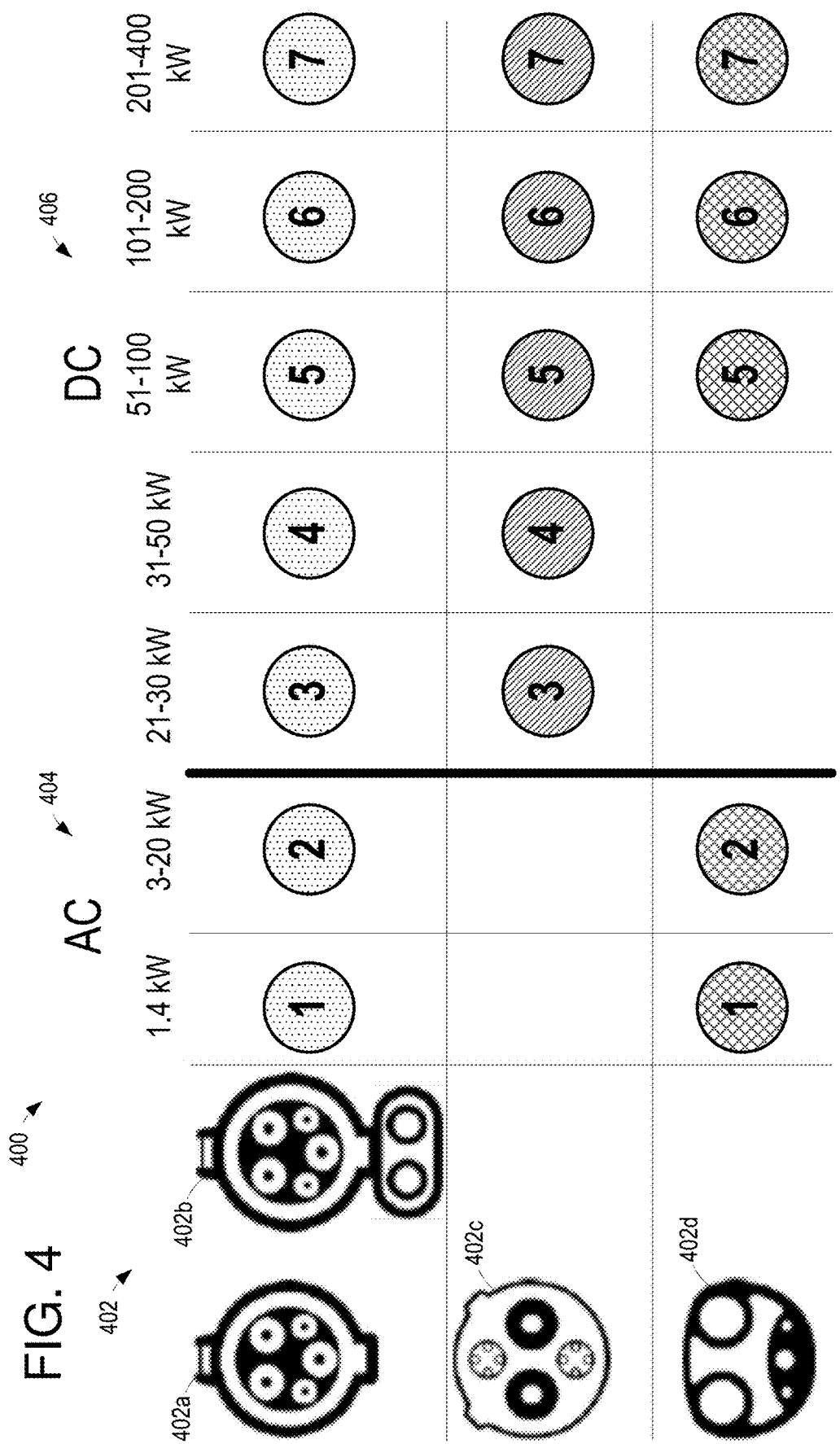
FIG. 4 illustrates an example index used to map connector types and power levels to associated standardized connector codes.

The received connector data may be (e.g., temporarily) stored at the server for further processing. Such further processing includes assigning each connector, for which connector data is received, a respective first identifier associated with a type of the connector, as indicated at 304. As indicated at 306, the first identifier may be assigned from a graphical appearance system, such as a standardized color system. In order to perform the identifier assignment, the server may access a standardization index or look-up table, which maps charging connector types to associated colors and/or other graphical appearance features (e.g., patterns, shapes, sizes, etc.). Examples of connector type mapping are shown in FIG. 4 and described in more detail below.

At 308, the method includes assigning each connector a respective second identifier associated with a power level of the connector. For example, the second identifier may be assigned from a numbering system (e.g., a number), as indicated at 310. In order to reduce a quantity of different number assignments provided to connectors, the numbering system may be configured to map each standardized number (or some of the standardized numbers) to a range of power levels, as will be described in more detail below with respect to FIG. 4. In some examples, the connector data received at 302 may not include a direct indication of a connector type and/or power level of connectors provided at a charging station. In such examples, a rules engine, such as rules engine 114 of FIG. 1, may be applied to determine the connector type and/or power level based on other information regarding the charging station (e.g., a charging network, a quantity of DC connectors, a quantity of AC connectors, etc.), which is then mapped to a respective graphical appearance and number per the standardization described above. It is to be understood that the standardized graphical appearance system and numbering system described herein are exemplary, and any suitable standardization system may be used to assign standardized, user-friendly codes to charging connectors.

At 312, the method includes, for each connector, generating and storing a combined connector code including the respective first identifier and second identifier for that connector. In this way, the combined connector code may provide a standardized connector code for each of the connectors described by the connector data received at 302. At 314, the method includes, for each charging station, storing an indicator of a connector count (e.g., a quantity of connectors) associated with each connector code at that charging station. Accordingly, the method may include deriving multiple sets of color/number/count data (e.g., as described at 312 and 314) for each portion of data received at 302. Indicating a connector count may be helpful in charging station query servicing, which may utilize connector count to estimate whether a selected charging station is likely to have an available charging bay (e.g. a charging bay that is not in use to charge another vehicle) associated with a selected connector code. For example, the likelihood of an available connector associated with a selected connector code may increase with a connector count for that connector code.

The connector count may be derived by feeding the connector data received at 302 and/or data regarding the charging station to a rules engine, which includes rules for deriving or estimating a distribution of connectors at a charging station. For example, parameters such as connector types that are present at the charging station, number of DC fast charging connectors, number of level 2 (e.g., AC charging) connectors (e.g., where the number of DC fast charging connectors and the number of level 2 connectors may be summed to determine a total number of connectors available at the charging station), and charging network for a selected charging station may be input into the rules engine. The rules engine may apply rules, such as constraints on a total number of connectors of each type/power level for charging stations associated with a given network, in order to derive or estimate the total number of connectors associated with each connector code that is present at a selected charging station. For example, based on a network to which a charging station belongs, if the charging station includes multiple types of connectors, a rule set may specify how to divide the total number of connectors between the different connector types and power levels. The rules engine may include rules indicating that charging stations of a given charging network have constraints relating to connector counts and/or distribution (e.g., one 50 kW CHAdeMO connector and one 150 kW J1772COMBO connector) and, when provided with input from a charging network Application Programming Interface (API), may apply the constraints to output a determination that a charging station of interest has a particular distribution of standardized connector plug types (e.g., two connector plug types: one Blue and one Green) and a particular distribution of standardized power levels (e.g., two different power levels: one Level 4 and one Level 6). As another example, data retrieved at 302 may include output from a charging station data source that indicates, for a given charging station (e.g., a station associated with id 94768), types of connectors (e.g., CHADEMO, J1772, and J1772COMBO for the below example), a quantity of dc fast charging connectors (e.g., 1 in the below example), a number of level 2 connectors (e.g., 8 in the below example), and a charging network (e.g., EV Connect in the below example). An example of the data retrieved at 302 follows:

```
{
id: 94768,
ev_connector_types: [
"CHADEMO",
"J1772",
"J1772COMBO"
],
ev_dc_fast_num: 1,
ev_level2_evse_num: 8,
ev_network: "EV Connect",
}
```

As a result of providing the above data as input to the rules engine, an example associated output may indicate a station identifier (e.g., Efficient Drivetrains), a charging network of the station (e.g., EV Connect), and a count of connectors provided in standardized form (e.g., blue 4, count 1; green 4, count 1; green 2, count 8—indicating that there is 1 blue 4 type connector, 1 green 4 type connector, and 8 green 2 type connectors at the station). The rules engine may be configured to accept (and provide standardized connector information output based on) network data that includes only some details (e.g., plug types, but not kW power levels for connectors on the network), as well as network data that provides more details (e.g., both plug type and kW power levels for connectors on the network). In either of the above cases, the rules engine may be configured to use the network data to categorize the connectors for a charging station accordingly into standardized connector codes (e.g., a color and level number for each connector and a count indicating a quantity of each color/level number present at the charging station).

FIG. 4 shows an example index 400 used to map connector types and power levels to associated standardized connector codes. Example connector types (e.g., socket types) are shown at 402, where connectors 402*a* and 402*b* represent J1772 type connectors (connector 402*b* including a two-pin DC connector to form a combo inlet referred to as a combined charging system or SAE combo connector), connector 402*c* represents a CHAdeMO type connector, and connector 402*d* represents a TESLA type connector (e.g., a North American TESLA Supercharger connector). Each connector type is assigned a first identifier (e.g., using a standardized graphical appearance system, such as a standardized coloring system, a standardized shape system, a standardized patterning system, and/or any combination of standardized graphical appearance systems). For example, the different fill patterns of the circles for each of the connector types may represent a respective color associated with that connector type. It is to be understood that the illustrated connector types are representative in nature, and additional or alternative connector types, including wireless electrical energy sources, may be mapped to respective associated first identifiers (e.g., different colors/patterns other than those used for the connectors shown in FIG. 4) without departing from the scope of the disclosure.

Example AC power levels are shown at 404 and example DC (e.g., fast charge) power levels are shown at 406. The power levels are grouped into power level ranges and each power level range is assigned a second identifier (e.g., using a standardized numbering system). For example, the AC power levels 404 include two groups of power levels—a first group (assigned the number "1") associated with a power level of 1.4 kW and a second group (assigned the number "2") associated with power levels in a range from 3-20 kW. The DC power levels 406 include five groups of power levels, where each group is assigned a respective number (e.g., a number 3-7). It is to be understood that the illustrated power level groupings are representative in nature, and additional or alternative power level groups (e.g., having different distributions of power levels and/or extensions to power levels above 400 kW) may be mapped to additional respective associated second identifiers (e.g., numbers higher than 7) without departing from the scope of the disclosure.

Figure 5:
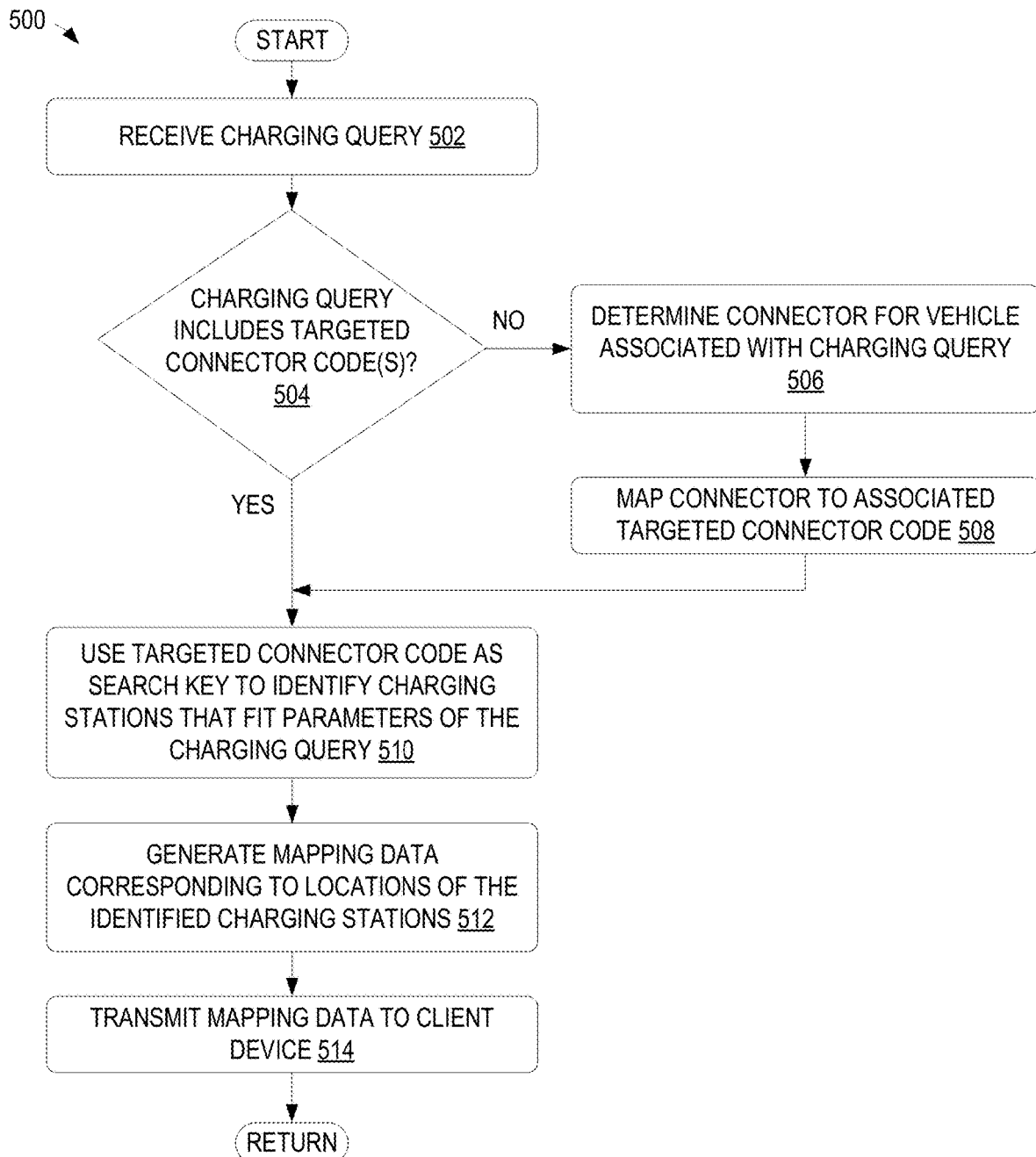
FIG. 5 is a flow chart illustrating an example method for servicing charging station queries using a standardized connector code system.

FIG. 5 is a flow chart of an example method 500 for servicing a charging station query. Method 500 may be performed at a server, such as server 102 of FIG. 1. At 502, the method includes receiving a charging query, which includes one or more query parameters. The charging query may be received from a client device, either directly or via one or more intervening computing systems. For example, the charging query may be input at the client device, and the input information may be transmitted to the server without substantive processing (e.g., with only minimal processing for formatting the input information for transmission to the server and/or for translating the input information for compatibility with the server). In such an example, the charging query may be processed and parsed by the server in order to derive the query parameters (e.g., if a natural language query "show me nearby charging stations that are compatible with my vehicle" is received, the server may process the query to determine that the query parameters include a location of the vehicle and connector codes that are compatible with the vehicle). In other examples, the input information for the charging query may be transmitted from the client device to an intervening computing system to parse the query and/or otherwise perform additional processing in order to reduce processing at the server. In such examples, the query parameters may be derived based on the received charging query with minimal processing by the server (e.g., using the above example natural language query as an original input, the processed query received at the server may directly include a location of the vehicle and connector codes that are compatible with the vehicle).

The above-described example query regarding charging stations near a user is understood to be illustrative in nature, and the charging query may include any suitable request for information regarding charging options for a vehicle. In another example, a charging query may request information regarding locations of charging stations belonging to a particular network and/or charging stations that include connectors associated with connector codes that are selected from the user (e.g., regardless of whether the selected connector codes are compatible with the vehicle of the user). A charging query may also request timing information for recharging at a particular charging station and/or information regarding locations of charging stations that have a fastest charging capability for recharging a selected vehicle. Other example charging queries may not directly request information regarding particular charging stations, and instead may request information that can be supplemented with charging station information and/or that may be based on charging station information. For example, a charging query may include a request for a route between two locations, where the route may be determined based on compatible charging stations that are distributed between the two locations (e.g., as described in more detail with respect to FIG. 11).

At 504, the method includes determining if the charging query includes one or more connector codes of interest (e.g., targeted connector codes). If the charging query does not include one or more targeted connector codes (e.g., "NO" at 504), the method includes determining a connector for a vehicle associated with the charging query, as indicated at 506. The vehicle associated with the charging query may be derived from the parameters of the charging query and/or information regarding the source of the charging query (e.g., a user and/or associated device that provided the charging query). For example, the server may access a user/vehicle profiles database, such as the user/vehicle profiles database 118 of FIG. 1, to identify a vehicle and connectors that are associated with a user providing the query. As another example, if the charging query includes an identification of a vehicle (or if such an identification is derivable using the information from the charging query), the server may access a vehicle connector database (e.g., vehicle connector database 116 of FIG. 1) to identify connectors associated with the vehicle. At 508, the method includes mapping the determined connector to an associated targeted connector code. For example, the mapping may be performed using an index such as the index 400 of FIG. 4.

If the charging query includes one or more targeted connector codes (e.g., "YES" at 504) and/or once a targeted connector code is determined/mapped at 506/508, the method includes using the targeted connector code(s) as a search key to identify charging stations that fit the parameters of the charging query (e.g., charging stations that are compatible with the targeted connector code(s)), as indicated at 510. Charging stations that are determined to fit the parameters of the charging query may include charging stations that match all or a portion of the parameters. Matching a parameter relating to a connector code may include offering a charging connector that is compatible with the connector code, while matching a parameter relating to a location may include being located in an area within a threshold distance of the location (e.g., where the threshold may be set based on user preferences, specified in the query, and/or set to a default value, which may correspond to a range (on a full battery charge) of a vehicle associated with the query).

At 512, the method includes generating mapping data corresponding to locations of the identified charging stations. At 514, the method includes transmitting the mapping data to a client device (e.g., the client device that provides the charging query). The mapping data may include a list of geolocations of the identified charging stations, which is usable by a client device to generate or populate a map for display showing the locations of the identified charging stations. The mapping data may also include detailed information regarding the identified charging stations, including the connector codes that are available at the identified charging stations and/or the quantity of connectors corresponding to each connector code (e.g., the connector code count) at each charging station of the identified charging stations.

Figure 6:
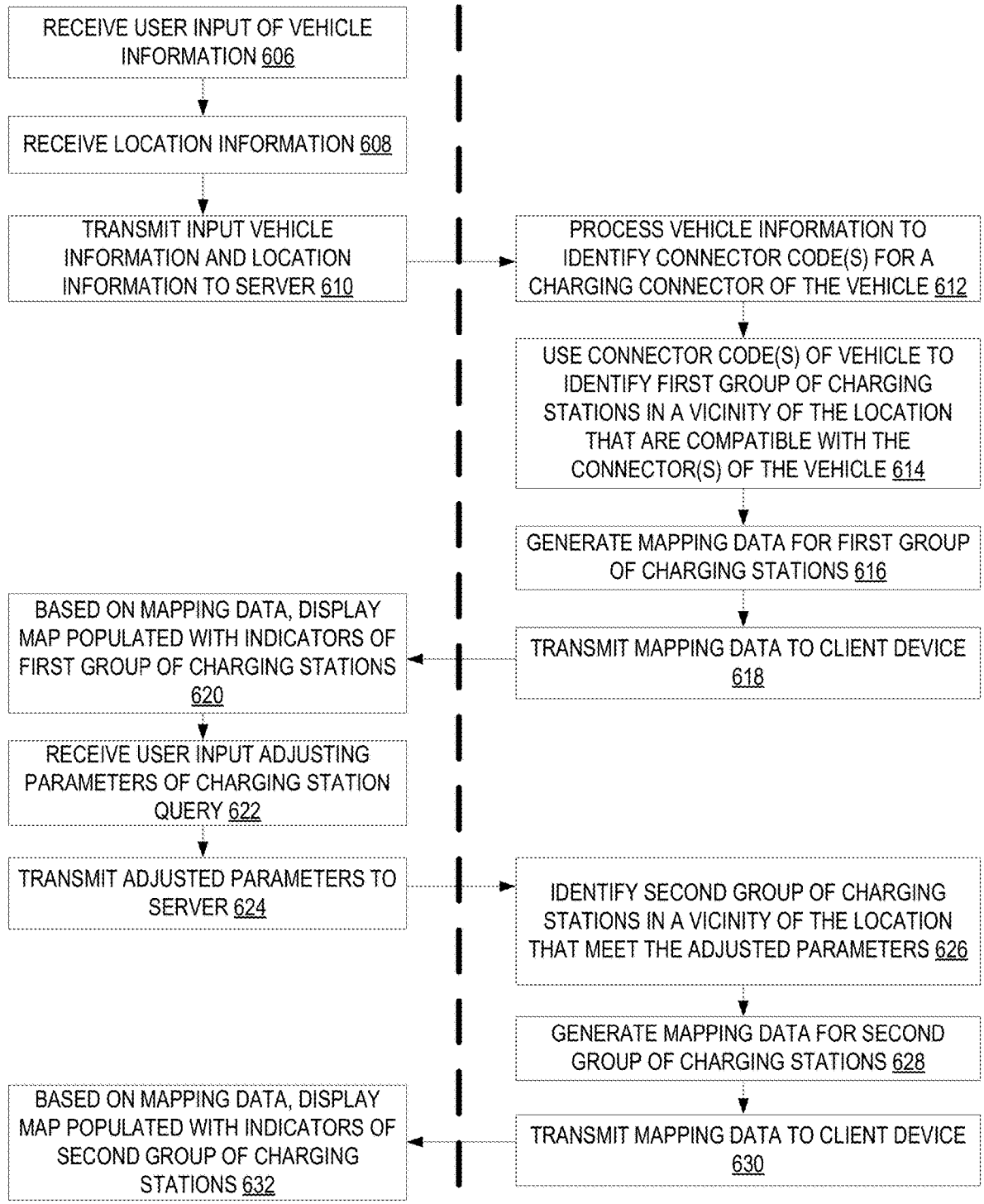
FIG. 6 is a communication diagram illustrating example communications between a client device and a server during the servicing of a charging station query.

FIG. 6 shows an example communication diagram 600 illustrating an example division of processing and communications between a client device 602 and a server 604 during a charging station query servicing scenario. In the scenario depicted in FIG. 6, the initial query relates to charging stations that are compatible with a vehicle of the user, however, it is to be understood that similar operations may be performed for queries that are not specific to a particular vehicle (e.g., queries that target connector codes that are selected by a user independently of the connector codes that are compatible with the vehicle). At 606, the client device receives user input including vehicle information. The vehicle information may include a particular vehicle identifier (e.g., a Vehicle Identification Number [VIN]) and/or other information including a vehicle make, model, year, trim, etc. The vehicle information may also include charging system information for the vehicle, including an indication of a charging connector (e.g., a connector type and/or power level, or a standardized connector code) and/or any adapters for expanding compatibility of the charging connector of the vehicle. At 608, the client device receives (or derives) location information (e.g., from an onboard sensor, an external data source, an input from the user, etc.) for a charging query. The client device 602 then transmits the input vehicle information and the location information to the server 604 as a charging station query, as indicated at 610.

At 612, the server 604 processes the vehicle information to identify one or more connector codes for a charging connector of the vehicle. For example, if the vehicle information includes one or more compatible connector codes for the vehicle, the processing at 612 may include identifying and extracting the connector code information from the vehicle information. In other examples, where the vehicle information includes a connector type and power level, the server may consult an index, such as index 400 of FIG. 4, to map the connector type and power level to a connector code. In still other examples, where the vehicle information includes a vehicle identifier and/or other information (e.g., make/model, etc.), the server may consult a database, such as vehicle connector database 116 and/or user/vehicle profiles database 118 of FIG. 1, to match a connector code to a vehicle described by the vehicle information.

At 614, the server 604 uses the identified connector code(s) to identify a first group of charging stations in a vicinity of the location that are compatible with the connector(s) of the vehicle. A charging stations may be considered to be in a vicinity of the location when the charging station is within a threshold distance of the location, where the threshold is set based on user preferences, user input, and/or a preset default. The server 604 then generates mapping data for the first group of charging stations, as indicated at 616. At 618, the server 604 transmits the mapping data to the client device. The identification of the charging stations and generation/transmission of mapping data associated therewith may correspond to the similar operations at 510, 512, and 514 of method 500 of FIG. 5.

Figure 7:
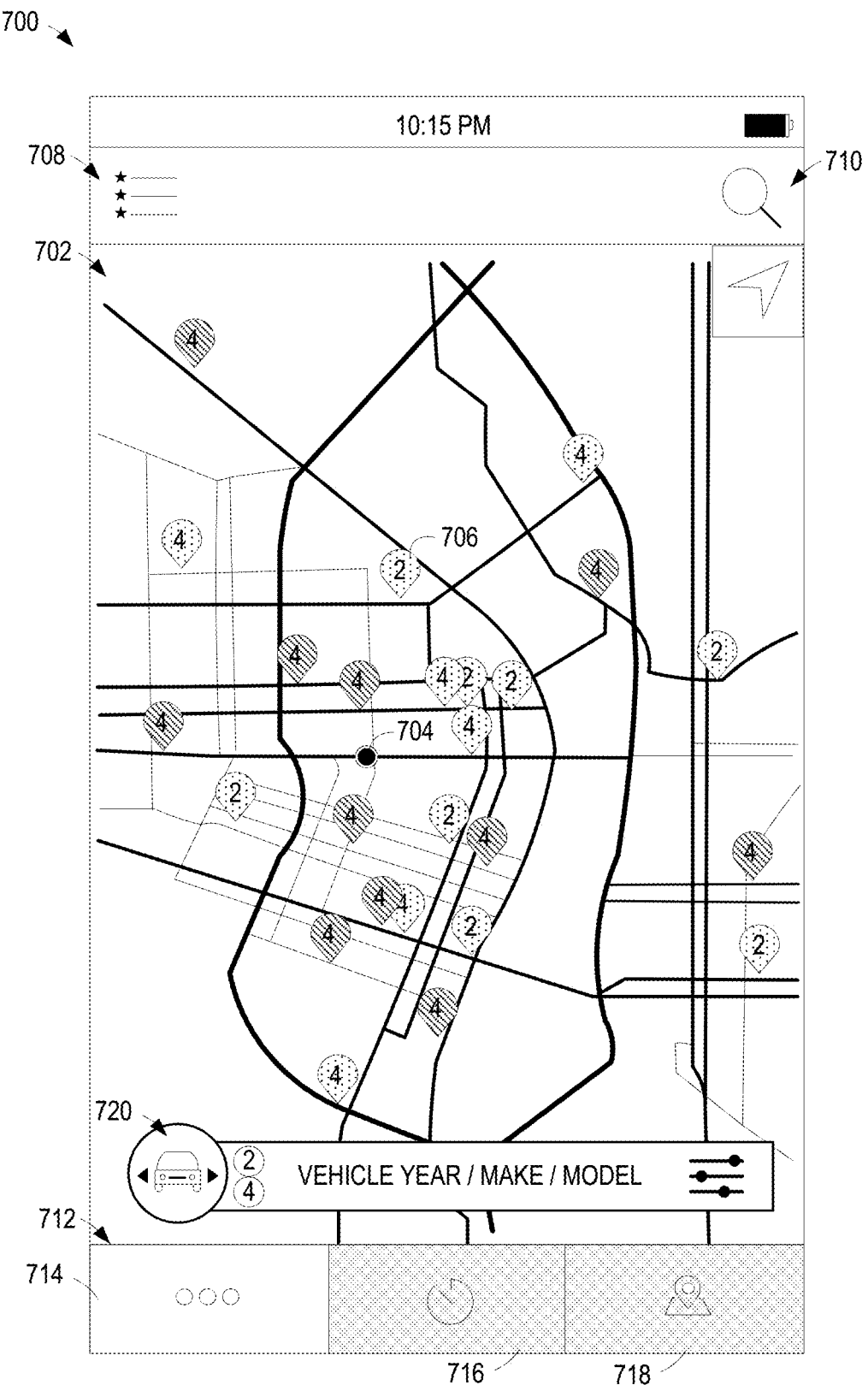
FIG. 7 shows an example graphical user interface providing a mapping output resulting from a charging station query.

At 620, the client device 602 displays, based on the mapping data from the server, a map populated with indicators of the first group of charging station. An example of such a map is shown in FIG. 7, as described in more detail below. At 622, the client device receives user input adjusting the parameter(s) of the charging station query. For example, the user may provide additional constraints for the charging station query in order to reduce the number of results and/or the user may change parameters of the charging station query in order to view different results. As a non-limiting example, the user may adjust the parameters of the charging station query by inputting an indication of additional or alternative connector codes that are to be included in the search and/or a further constraint on targeted power levels for the search (e.g., upon receiving a result showing a large number of nearby charging stations, the user may narrow down the results to target fastest charging options). At 624, the client device transmits the adjusted parameter(s) to the server.

At 626, the server identifies a second group of charging stations in a vicinity of the location that meet the adjusted parameters. The second group of charging stations may include all, some, or none of the charging stations from the first group, depending on overlap between the original parameters, the adjusted parameters, and features of the charging stations. At 628, the server generates mapping data for the second group of charging stations. The server transmits the mapping data for the second group of charging stations to the client device, as indicated at 630. In response, at 632, the client device displays, based on the new mapping data, a map populated with indicators of the second group of charging stations.

Although described with respect to a user-initiated adjustment of query parameters, it is to be understood that the operations at 624 through 632 may be iteratively performed on an automatic basis for instances where a map output is controlled to be periodically or dynamically updated based on one or more triggers. For example, in a scenario in which a user is moving while the communications of FIG. 6 are being performed, the user location may change over time. Accordingly, the changed parameters referenced at 624 may relate to a changed location of the vehicle, and the identification of additional groups of charging stations (as performed at 626) may be performed continuously as updates of the changing location are provided to the server. Correspondingly, the generation and transmission of mapping data at 628 and 630 may be iteratively performed for each charging station group identification, and the map displayed at 632 may be continuously updated to reflect the changing location and identified charging stations. Accordingly, as the vehicle travels along a route, the server may iteratively service additional charging station queries automatically, where servicing the additional charging station queries includes, for each additional charging station query, identifying a new subset of charging stations that includes charging stations within a threshold distance of the vehicle and that fit the parameters of the additional charging station query (e.g., match the connector code(s) of the query), and transmitting updated mapping data corresponding to the new subset of the charging stations to the client device. Similar iterative processing may be performed in the course of determining a route for a user, in which the adjusted parameters may include different locations along different candidate routes to identify charging stations along the different candidate routes.

FIG. 7 shows an example user interface 700 for an application that presents a result for a charging station query. The user interface 700 may be presented at a client device, such as client device 104 of FIG. 1 and/or client device 602 of FIG. 6. In the illustrated example, a central portion of the user interface 700 includes a map 702 showing a current location (or location of interest) 704 and a plurality of charging station indicators, an example of which is shown at 706. Each charging station indicator may be positioned on the map in a respective location corresponding to a geolocation of an associated charging station that fit the parameters of the charging station query. An appearance of the charging station indicator may identify a connector code for a selected connector of the associated charging station that fits the parameters of the charging station query. For example, the charging station indicator may have a color, pattern, and/or other graphical appearance (e.g., the illustrated dot fill of indicator 706, which may represent a color such as blue) that corresponds to a connector type of the selected connector and a numerical indicator (e.g., the number "2" of indicator 706) and/or other character-based indicator that corresponds to the power level of the selected connector. In examples where a charging station provides multiple connectors that fit parameters of the charging station query, the associated charging station indicator may indicate a connector code for a connector with the highest power level available at the station that fits the parameters of the charging station query.

The map 702 may be generated based on mapping data received from a server (e.g., responsive to the charging station query, as described with respect to operations 512 and 514 of method 500 of FIG. 5 and operations 616 and 618 of communication diagram 600 of FIG. 6) and/or from a location sensor (e.g., local to or in communication with the client device). For example, mapping data from a location sensor, such as a Global Positioning System (GPS) unit and/or an inertial measurement unit (e.g., an accelerometer, gyroscope, etc.) may be used to generate a base map and display an indication of a current location of the client device (or location of interest, such as a location targeted in a charging station query) thereon (e.g., as shown at 704). Mapping data received from the server may include geolocations of charging stations that fit parameters of a charging station query and indications of connector codes of interest associated with the charging stations. Accordingly, the mapping data received from the server may be used to generate and display the charging station indicators on the base map (e.g., as shown at 706).

The map 702 may be dynamically presented and/or otherwise configured to be updated responsive to movement of the user (e.g., so the map "follows" the user by continuously showing areas within a threshold distance of the user) and/or user input. The user movement may be derived from movement of a vehicle in which the user is located and/or movement of the client device that is in use by the user in some examples. The user input may include user input to pan, zoom, and/or perform other adjustments to the map 702 and/or user input to adjust a charging station query or location of interest, resulting in an update of the displayed charging station indicators to fit the parameters of the adjusted query. The map 702 may also be updated based on user input selecting a charging station of interest. For example, the charging station indicators may be selectable user interface objects, which are selectable to view information regarding the associated charging station (e.g., a full name, address, distance from a current location/location of interest, charging network, connector codes for connectors, and/or other information for the associated charging station) and/or to provide additional options relating to travelling to the associated charging station and/or charging at the associated charging station (e.g., a charge time for charging an electric vehicle associated with the user at the charging station using a connector corresponding to the selected indicator).

The user interface 700 may include user interface elements to adjust the query results output. For example, a station list view element 708 may be selectable to toggle from a map view to a list view showing a list of charging stations (e.g., a list of charging station identifiers, such as charging station names, and/or selected information about the charging stations, such as a location of/distance to the charging stations and connector codes available at the charging stations) that fit parameters of a search query. A search element 710 may be selectable to activate a search mode of the application, in which a keyboard or other search entry mechanism is provided for a user to input one or more search terms to filter or adjust results shown on the map 702. For example, if the input provided after activating the search mode includes a location value, the entry of the location value may be processed by the application and used to reset the map view to a new location based on the location value (e.g., including replacing the displayed charging station indicators with indicators associated with charging stations that are closer to the new location). In order to reset/update the map, the search terms entered by the user may be transmitted to a server to provide geolocations of charging stations that fit parameters of the search term and/or charging stations that fit parameters of a prior charging station query that are within a threshold distance of a newly-entered location.

The user interface 700 may include additional user interface elements to access other features of an application that provides the user interface. For example, the user interface includes an action bar 712 which includes selectable options to change a function of the application. The function illustrated in the example of FIG. 7 corresponds to a stations function (e.g., for providing search queries to locate and display charging stations that fit parameters of the search queries), indicated by the stations element 714. The action bar may also include a timer element 716 and a trip planner element 718. A vehicle element 720 may also be provided in the user interface 700 to show details for a currently selected vehicle (e.g., a vehicle year, make, model, and compatible connectors for the vehicle indicated via connector codes). The vehicle element 720 may be selectable to view and manage information regarding one or more vehicles of the user. For example, selecting the vehicle element 720 may replace at least a portion of the map with editable information regarding the one or more vehicles of the user.

The timer element 716 may be selectable to provide a charge timing function of the application to determine an amount of time to charge a battery of a vehicle of interest based on a desired range of the vehicle (which may be a full range of the vehicle, corresponding to fully charging the battery, or a partial range of the vehicle, corresponding to partially charging the battery), a current charge status of the vehicle (e.g., a range of the vehicle based on a current charge level of a battery of the vehicle), and a selected power level for recharging the vehicle (e.g., represented by a connector code selected by the user and/or associated with a charging station of interest). For example, selecting the timer element 716 may replace at least a portion of the map with a trip planner interface including selectable elements to set the parameters of the timer (e.g., the range, charge status, power level, etc.) and an output indicating a determined charge time for the selected parameters.

The trip planner element 718 may be selectable to provide a trip planning function of the application to determine a route between a starting location and a destination (optionally including one or more waypoints) and charging station options for maintaining a targeted charge level of a vehicle battery (e.g., at waypoints of the route and/or at a destination of the route). Examples relating to performing a trip planning operation are described below with respect to FIGS. 11-13.

Figure 8:
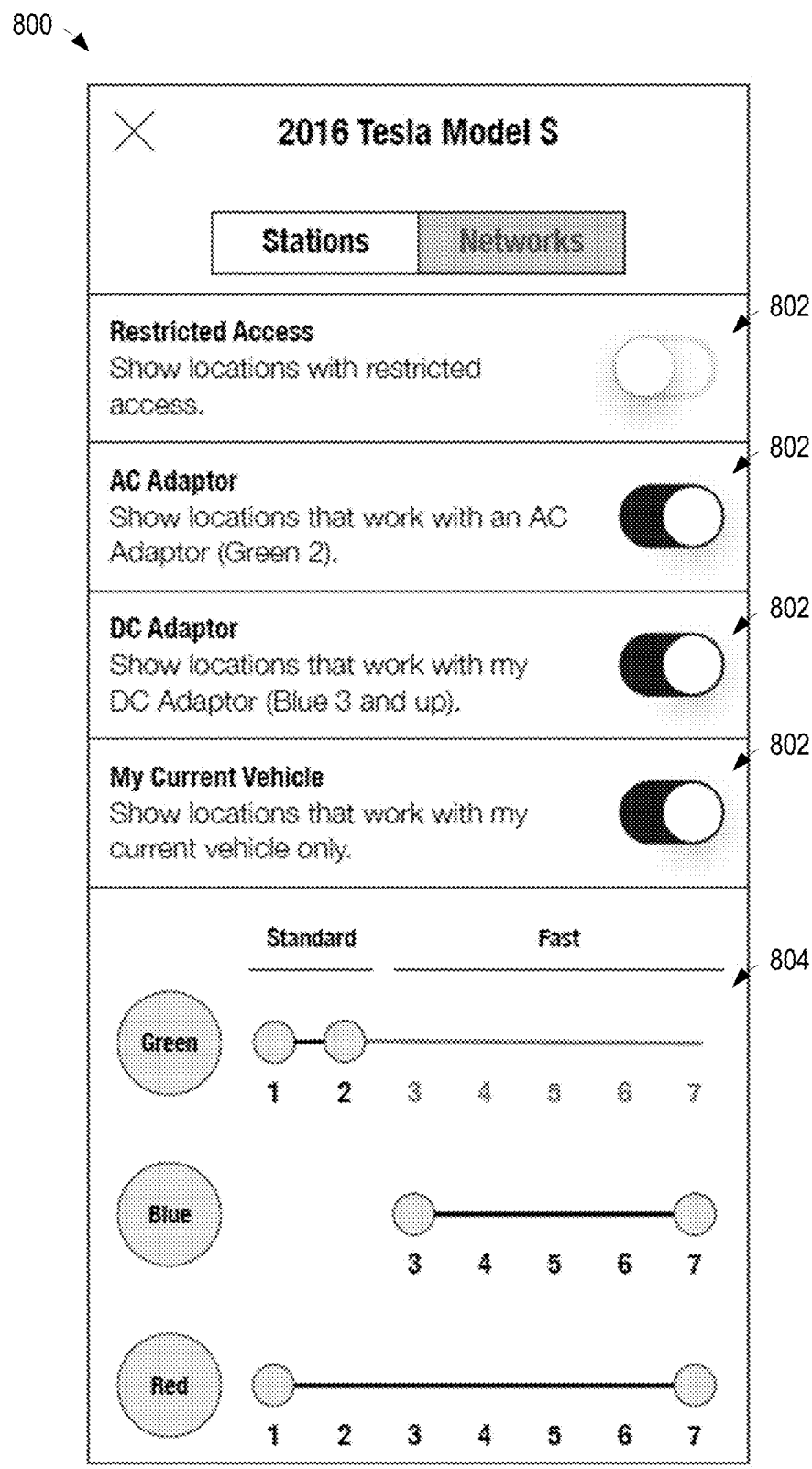
FIG. 8 shows an example graphical user interface providing options for adjusting parameters of a charging station query.

FIG. 8 shows an example user interface 800 for setting and/or adjusting parameters for a charging station query. For example, user interface 800 includes a plurality of toggle buttons 802 to control the inclusions of different categories of charging stations in a query result. For example, the toggle buttons 802 may be actuated (e.g., via user input, such as touch input to the user interface as displayed on a client device) to control whether a query result will include charging stations with restricted access (e.g., charging stations that require membership or other credentials/conditions to use), charging stations that work with a charging connector adapter (e.g., an adapter that expands capabilities of a vehicle charging port to work with alternating current [AC] connections and/or direct current [DC] connections), and charging stations that are only compatible with a current vehicle (e.g., a vehicle that is currently selected as a vehicle of interest and/or a vehicle that a user is currently occupying). User interface 800 also includes a plurality of selectors 804 that are actuatable to select one or more connector codes of interest. For example, a user may select an indicator of a color (e.g., "Green," "Blue," "Red") to indicate an interest in a connector type associated with that color. For each selected color, the user may select one or more (or a range of) numbers to indicate an interest in a connector power level (of the selected connector type) associated with that number(s). In the illustrated example, a user has selected connector codes associated with Green 1 and 2, Blue 3-7, and Red 1-7. The selectors 804 may also be automatically set based on other settings provided by the user (e.g., Blue 3-7 may be selected responsive to the user toggling the DC adapter button of toggle buttons 802 to show locations that work with a DC adapter.

The user may provide input to user interface 800 and/or another user interface window for the application providing user interface 800 in order to select other settings for filtering charging station search results. Example additional settings include charging networks of interest, maximum distance from a current location/location of interest, minimum number of connectors at a given charging station that are currently-available (e.g., not being used to charge another vehicle) or predicted to be available by an arrival time, minimum charging station rating from one or more user review databases, etc. It is to be understood that the interface mechanisms (e.g., toggle buttons, sliders, etc.) shown in FIG. 8 for selecting the settings are exemplary, and any suitable mechanism for entering the search query parameters/settings may be provided by a user interface of the application.

Figure 9:
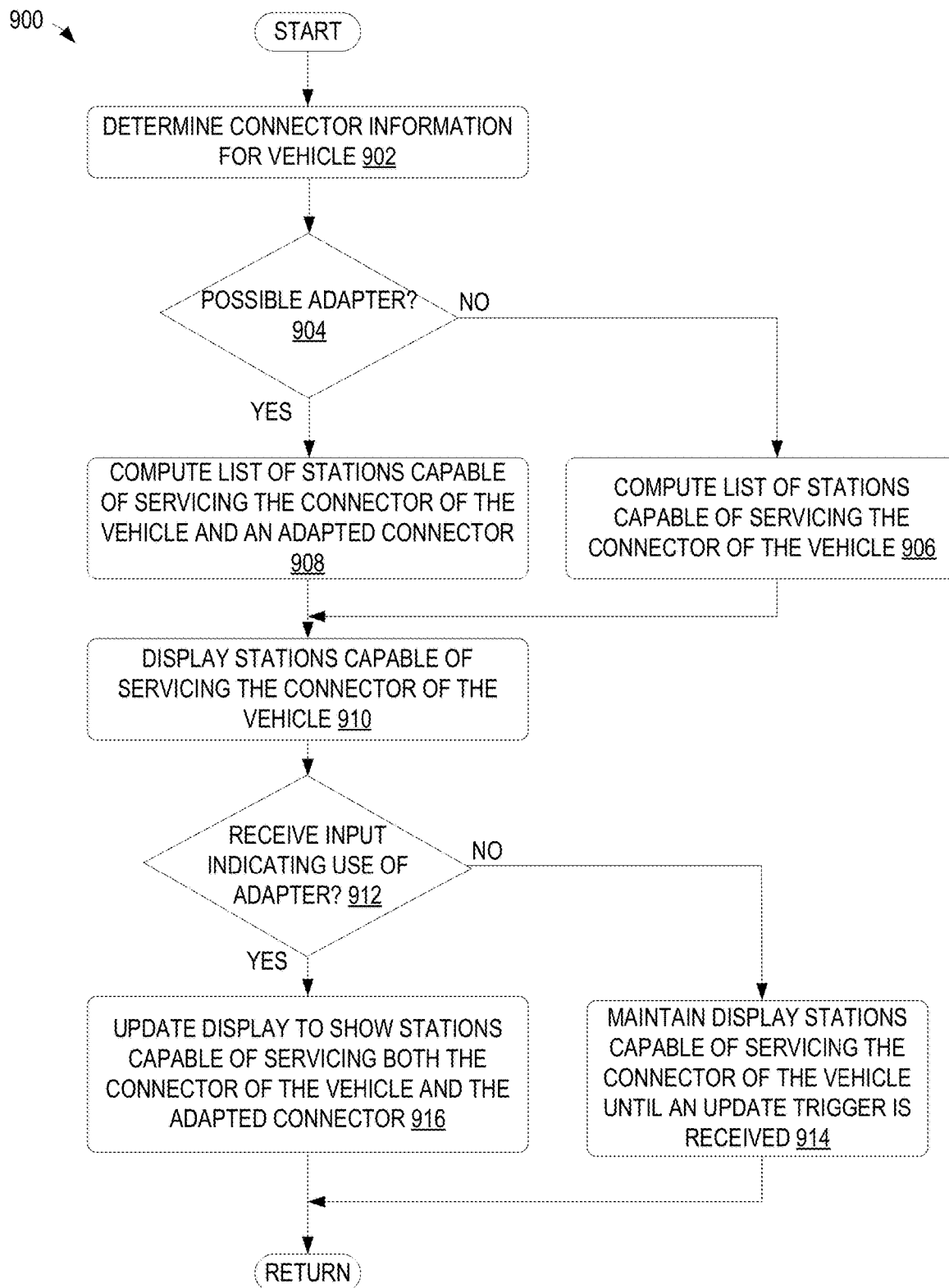
FIG. 9 is a flow chart illustrating an example method for servicing charging station queries including accounting for a potential adapter that expands compatibility considerations for an electric vehicle.

FIG. 9 is a flow chart of an example method 900 for providing a quick update of charging station query results based on a desired use of a connector adapter (e.g., an adapter that allows a vehicle to charge using different connectors than a native connector found on a vehicle associated with a user). Method 900 may be performed by a client device, such as client device 104 of FIG. 1 and/or client device 602 of FIG. 6. At 902, the method includes determining connector information for a vehicle of a user. For example, determining the connector information may include receiving an entry of the connector information (e.g., as a standardized code and/or as a connector type and power level) from the user and/or receiving information from the user that is useable to derive the connector information (e.g., a vehicle make/mode/etc. that may be stored in association with a vehicle in a vehicle connector database, etc.). Accordingly, the determining of the connector information may be performed locally at the client device and/or by exchanging information with another device, such as a server, that is able to derive the connector information based on information input to the client device.

At 904, the method includes determining if there is a high likelihood that the user is planning to use or is in possession of an adapter that expands the connectivity of the vehicle. The likelihood of use of an adapter may be based on a vehicle/vehicle connector type (e.g., some charging connections may have more readily available adapters than others, and thus may be associated with a higher likelihood of use of an adapter than other vehicles).

If an adapter is not likely to be used (e.g., if the likelihood of using the adapter is below a threshold, "NO" at 904), the method includes, at 906, computing a list of stations capable of servicing the connector of the vehicle based on the connector information determined at 902. Computing the list of stations capable of servicing the connector may include transmitting a charging station query including the connector information determined at 902 to a server for processing (e.g., to control the server to perform a query servicing operation, as described with respect to method 500 of FIG. 5). If an adapter is likely to be used (e.g., if the likelihood of using the adapter is above a threshold, "YES" at 904), the method includes, at 908, computing a list of stations capable of servicing the connector of the vehicle and an adapted connector (e.g., a connector corresponding to the charging input compatibilities of the vehicle when adapted). Similarly to the computation at 906, computing the list of stations at 908 may include transmitting a charging station query to a server, however, the query at 908 includes the connector information determined at 902 as well as adapter information indicating the expanded capabilities of the charging system of the vehicle when the adapter is used.

At 910, the method includes displaying the stations capable of servicing the connector of the vehicle. For example, the stations may be displayed in a map view and/or a list view, as described above with respect to FIG. 7. An additional example output is described below with respect to FIG. 10. At 912, the method includes determining if input indicating use of an adapter is received. For example, the input may include input to a user interface of the client device selecting an adapter user interface element. If no input indicating use of an adapter is received (e.g., "NO" at 912), the method includes maintaining the display of the stations capable of servicing the connector of the vehicle until an update trigger is received, as indicated at 914. The update trigger may include an input indicating use of an adapter or another trigger for updating a charging station query (e.g., a change in position, a change in query parameters, an exiting of the application or query, etc.), at which point, an updated query is processed and displayed accordingly. If input indicating use of an adapter is received (e.g., "YES" at 912), the method includes updating the display to show stations capable of servicing both the connector of the vehicle and the adapted connector, as indicated at 916. An example of such an update of the display is described below with respect to FIG. 10.

Figure 10A:
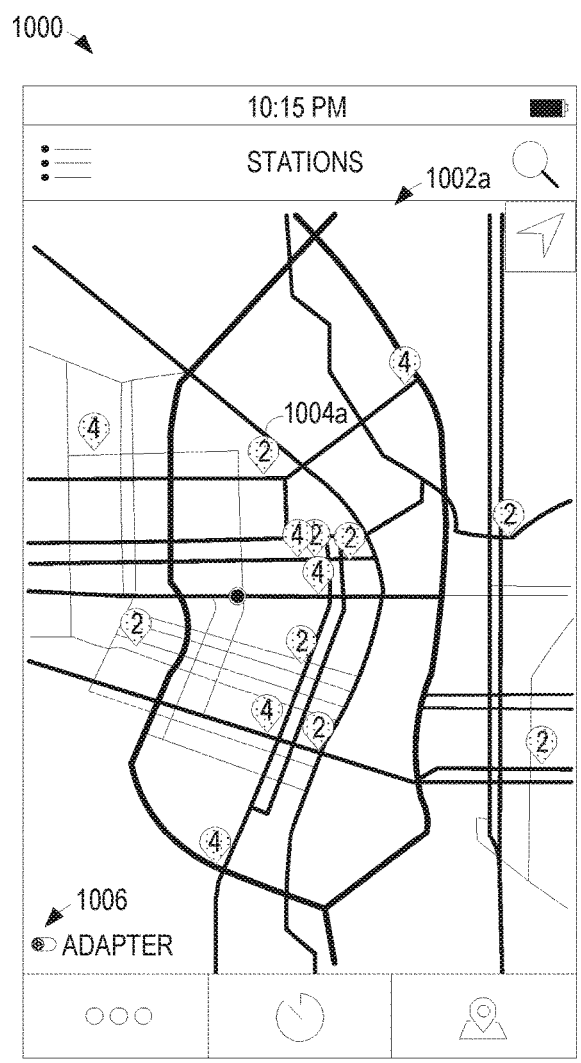
FIGS. 10A and 10B show different states of an example graphical user interface including a toggleable user interface element for selectively showing results that account for an adapter that expands compatibility of an electric vehicle.
Figure 10B:
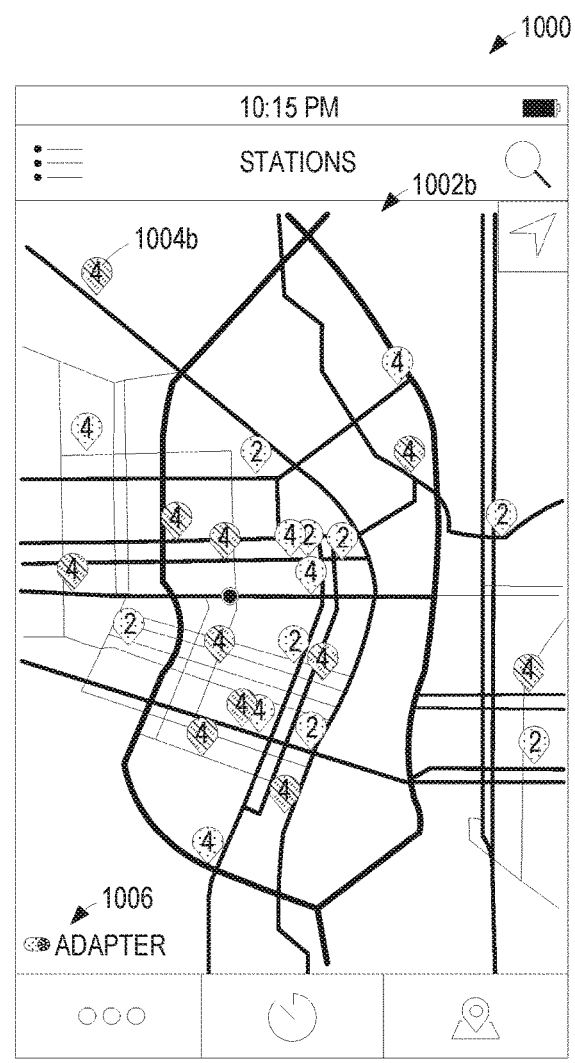

FIG. 10 shows different states of a user interface 1000, presenting results of a charging station query. In the state designated as (A), the user interface 1000 includes a map 1002*a* showing charging station indicators (an example of which is shown at 1004*a*) identifying locations of charging stations in a first group. The first group of charging stations may correspond to a result of a charging station query in which charging stations that are compatible with a native connector for a vehicle are requested via the query. The user interface 1000 also includes an adapter element 1006, which is actuatable to indicate whether the user requests the charging station query to also include charging stations that are compatible with an adapter for allowing the vehicle to connect to additional charging connectors other than those that are compatible with the native connector. The adapter may relate to a known adapter for the vehicle associated with the user and/or an adapter that the user has previously specified via user input. Although illustrated as being located in a region of the map 1002*a*, it is to be understood that the adapter button 1006 may be positioned in a different location of the user interface 1000 and/or in a menu accessible via the user interface 1000 without departing from the scope of this disclosure.

In the state (A) of the user interface 1000, the adapter element 1006 is toggled off, resulting in the display of the first group of charging stations (which, as described above, correspond to connector codes of charging stations that are compatible with the native connector for the vehicle only). In the state (B) of the user interface 1000, the adapter element 1006 is toggled on, resulting in the display of charging station indicators (an example of which is shown at 1004*b*) identifying locations of charging stations in a second group. The second group of charging stations may include the first group (e.g., the charging stations that are compatible with the native connector of the vehicle) as well as additional charging stations that have connectors that are compatible with the native connector of the vehicle when augmented via the adapter. For example, the charging station indicators for the first group relate to charging stations having a first connector type (e.g., represented by the dot fill pattern of the indicators) and power level(s) (e.g., classified as a "4" or "2"). The charging station indicators for the second group are expanded to also include charging stations having a second connector type (e.g., represented by the diagonal line fill pattern of the indicators) and power level (e.g., classified as a "4") due to the ability of the adapter to connect to the connectors having the second connector type and power level. By performing a search for the additional charging stations prior to the user selecting the adapter (e.g., computing the list of stations compatible with both the native vehicle connector and the adapted connector as indicated at 908 of FIG. 9), the map may be quickly switched between the state shown at (A) and the state shown at (B) without (or with minimal) processing delays.

FIG. 11 is a flow chart of an example method 1100 for performing a trip planning operation using standardized connector codes (e.g., for identifying charging stations along candidate routes), which allows for a reduction in processing resources and an increase in user friendliness of the trip planning operation compared to other approaches that do not utilize the standardized connector codes of the disclosure. Method 1100 may be performed at a server, such as server 102 of FIG. 1 and/or server 604 of FIG. 6). At 1102, the method includes receiving at least one connector code, a starting location, and a destination for a vehicle. An example user interface for entering information pertaining to the above parameters is described below with respect to FIG. 12.

At 1104, the method includes identifying charging stations in a region associated with the starting location and the destination that are compatible with the connector code(s). The identification at 1104 may be performed in a similar manner to the operation performed at 510 of method 500 of FIG. 5. For example, the server may use the connector codes as a search key to identify charging stations, within the region of the starting location and the destination, that include connectors matching the connector codes. At 1106, the method includes determining a plurality of candidate routes from the starting location to the destination based on locations of the charging stations identified at 1104. For example, the candidate routes may include routes that connect the starting location to the destination and that include a sufficient number of compatible charging stations distributed thereon to enable the vehicle to traverse the route without completely depleting an energy storage unit (e.g., battery) of the vehicle. At 1108, the method includes calculating the travel time for each of the candidate routes and selecting a targeted route from the plurality of candidate routes to minimize a travel time. As indicated, the travel time may include, in addition to the time spent traveling along the route (e.g., based on a total distance of the route, speed limits along the route, and a traffic estimation along the route), time spent charging the vehicle at one or more charging stations along the route (e.g., based on a power level of the connectors at the one or more charging stations that are compatible with the vehicle and an amount of charging to be performed at each charging station, which may be based on a capacity of an energy storage unit of the vehicle and a targeted percentage to which the energy storage unit is to be charged).

At 1110, the method includes transmitting (e.g., to a client device) mapping data corresponding to the targeted route and the one or more charging stations along the route (e.g., the charging stations identified as being usable to recharge the vehicle along the route and minimize a travel time at 1108). The mapping data may include geolocations of the charging stations along the route and route segments that collectively form the route. The mapping data may be useable by an application of the client device to populate or generate a map that shows the route and the charging stations along the route. The mapping data may optionally include geolocations of route segments for one or more other candidate routes and associated charging stations (e.g., the candidate routes that provide the next fastest travel times relative to the targeted route). In this way, the client device may also display the one or more other candidate routes as alternative options for user selection. The mapping data may include a travel time and/or an indication of estimated charging times for recharging the vehicle (e.g., represented by a time and/or a standardized power level, as the charge time is based on the power level of the charging connection) at the charging stations along the targeted route and/or other candidate routes, which may be displayed at the client device in order to assist the user in selecting a route for travel and planning a trip along the selected route.

Additional or alternative data may be provided to the client device based on an execution of method 1100. For example, based on the information received at 1102, a distance between the starting location and the destination may be compared to a range of the vehicle (e.g., a total range or a current remaining range of the vehicle) in order to determine whether the trip may be completed without charging (e.g., if the distance is shorter than the range of the vehicle). If the trip is able to be completed without charging, an associated indication, which may also include an estimated remaining range of the vehicle after completing the trip, may be transmitted to the client device for presentation to the user. If the trip may be completed with charging, an associated indication, which may also include the mapping data for charging stations along the route as described above, may be transmitted to the client device for presentation to the user.

One or more warnings may also be generated and transmitted to the client device (e.g., based on the identification and determination made at 1104 and 1106, respectively). For example, a warning may be generated and transmitted indicating that a trip is not possible. Such a warning may be generated responsive to a determination that there are no routes between the starting location and the destination that meet a search query (e.g., include a sufficient number or distribution of compatible charging stations for enabling the vehicle to reach the destination without completely depleting an energy storage unit of the vehicle). If the vehicle is a hybrid electric vehicle (e.g., able to be operated using electrical energy stored in a battery of the vehicle and/or another fuel source, such as gasoline, stored in a tank of the vehicle), an example warning may indicate that a trip is not possible using only electricity but may be completed with the use of fuel. Such a warning may include data indicating locations of electric charging stations that are compatible with the vehicle as well as stations for the other fuel (e.g., gas stations) along a selected route. Any suitable information or warning(s) derived from the received information at 1102, the identification of charging stations at 1104, and/or the determination of candidate routes at 1106 may be transmitted to the client device in order to inform the user of potential issues or available options (e.g., suggestions based on the above received/identified/determined information) for the trip.

Figure 12:
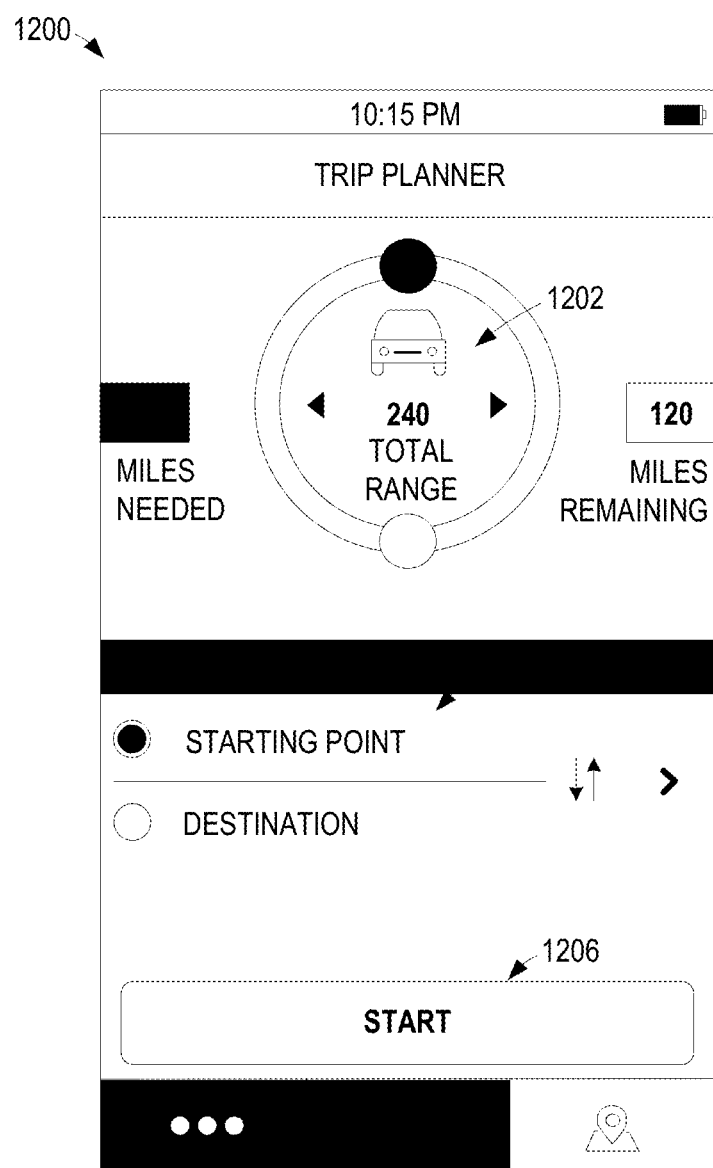
FIG. 12 shows an example graphical user interface providing options for setting parameters of a trip planning query.
Figure 13:
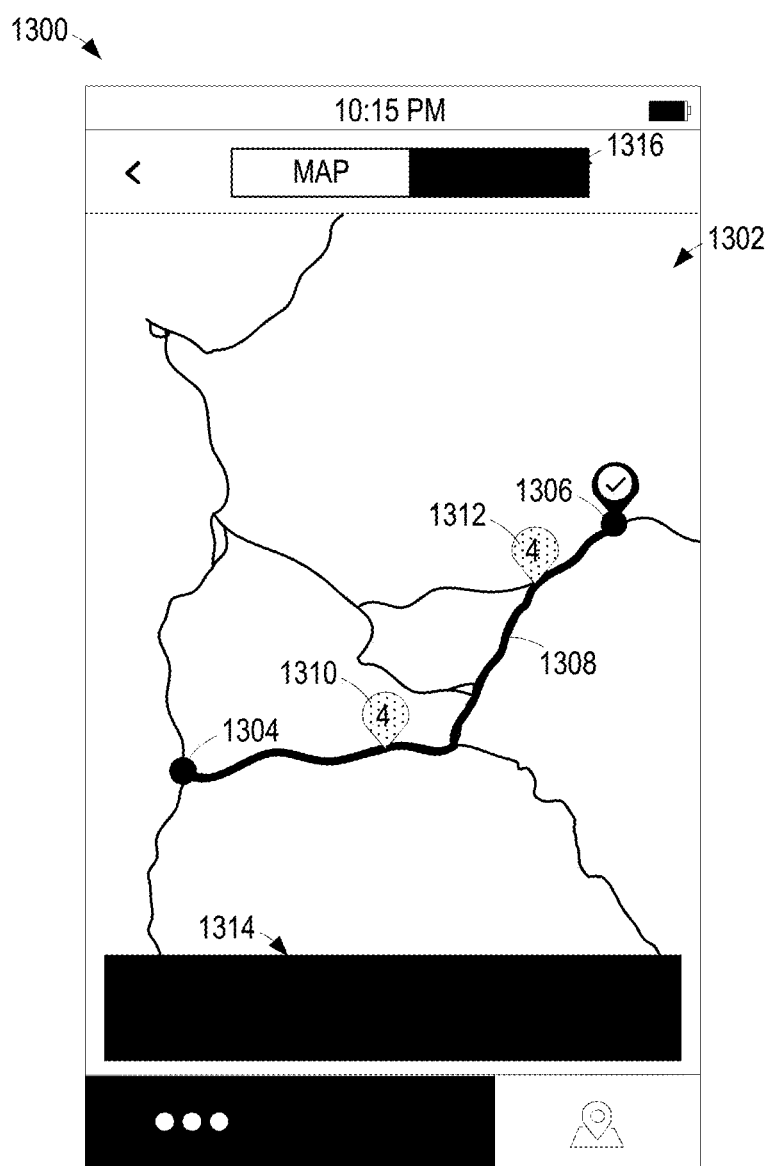
FIG. 13 shows an example graphical user interface providing an output route resulting from processing a trip planning query.

Additional details regarding trip planning operations are described with respect to FIGS. 12 and 13, which show example user interfaces for a trip planning function of an application executed on a client device (e.g., client device 104 of FIG. 1 and/or client device 602 of FIG. 6). FIG. 12 shows an example user interface 1200 for setting parameters for a trip planning query. For example, the user interface 1200 may include one or more user interface elements that are selectable to provide or set the parameters for the trip planning query. In the illustrated example, a vehicle information element 1202 may be selected to set a range of a vehicle, which may be used in the determine of the number of stops for charging will be needed to complete a trip (e.g., if a selected route for the trip spans more miles than a total range of the vehicle on a full charge of the vehicle battery, or a remaining range of the vehicle if a vehicle battery is partially discharged, at least one stop for charging will be needed to complete the selected route).

A location element 1204 may be selected to enter a starting point and a destination for the trip. For example, selection of the region of the user interface including the "STARTING POINT" text may bring up options to enter a location to be used as a starting point. For example, options for entering a particular location (e.g., via a keyboard of the client device, a pop-up keyboard temporarily provided in the user interface, a voice input, etc.) and/or selecting a particular location (e.g., a current location, a location on a map, a location from a history of recent locations) may be provided for a user to input a starting location for the trip. A similar mechanism may be used to provide options for entering a particular location to enable a user to input a destination (e.g., responsive to selection of the region of the user interface including the "DESTINATION" text).

Once the starting point and destination are set, the user may select the start button 1206 to begin calculating a route between the starting point and destination, taking into consideration charging constraints of the vehicle. For example, as described above with respect to FIG. 11, a route may be selected to include charging stations (when applicable) that are compatible with the vehicle and to minimize a travel time that includes time spent charging the vehicle at one or more charging stations.

FIG. 13 shows an example user interface 1300 illustrating an output of a route calculation for a trip planning operation. For example, the user interface 1300 may be presented after setting parameters of a trip planning query (e.g., after pressing the start button 1206 of FIG. 12 once the parameters are set). The user interface 1300 includes a map 1302 showing a starting point 1304 and a destination 1306, as well as a selected route 1308 between the starting point and the destination.

The user interface 1300 also includes a first charging station indicator 1310 and a second charging station indicator 1312 shown along the route 1308, as well as a route information element 1314 indicating a total time and distance of the selected route. The first and second charging stations may be selected to provide suitable recharging opportunities to power the vehicle for the length of the route. For example, the first charging station may include a fastest charging connection that is compatible with the vehicle in a region that is located toward the end of the vehicle range as measured from the starting point (e.g., accounting for a starting charge/range of the vehicle) and the second charging station may include a fastest charging connection that is compatible with the vehicle in a region that is located toward the end of the vehicle range as measured from the first charging station. The destination may be distanced from the second charging station by an amount that is less than the range of the vehicle, thus no further charging stations may be included in the selected route. In some examples, the route may be configured to locate charging stations within a portion (e.g., 80%) of the range of the vehicle from a previous charge point and/or the route may be calculated with the consideration that the vehicle will only charge a portion of a full charge (e.g., 80%). Some charging connections provide a fast charge up to a certain percentage capacity of a vehicle's battery and then charge the remaining percentage of the vehicle's battery at a much slower rate. Accordingly, the travel time may be minimized by only planning to partially charge the vehicle's battery (e.g., charging that battery to 80% using the fast charge capabilities of a charging station) at each charging station.

The user may provide input to the user interface 1300 in order to adjust the parameters of the trip planning, select an alternate route (e.g., one or more alternate routes may be displayed in the map for selection), and/or view the results of the trip planning in a list format (e.g., using the view selection element 1316). For example, upon selecting the "LIST" option in view selection element 1316, the map may be at least partially replaced with a scrollable (if applicable) list including an identification of the starting point, the first charging station, the second charging station, the destination, and any travel directions for driving the selected route. Locations or directions in the list may be selectable to provide additional information regarding that location/direction. For example, responsive to selecting an identification of the first charging station, the list may expand to show details regarding the first charging station, such as an address of the first charging station, a cost of recharging at the first charging station, an estimated time to charge at the first charging station, an indication of connector codes for connectors available at the first charging station (and a connector count indicating a number of connectors associated with each connector code are available at the first charging station), etc.

Figure 14:
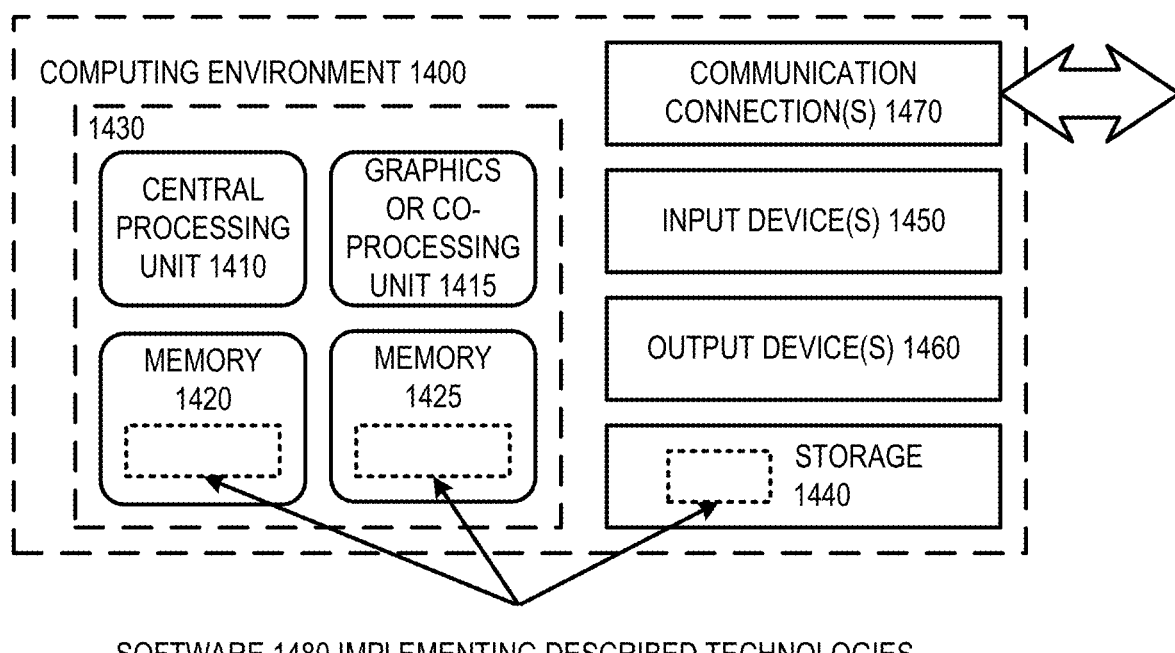
FIG. 14 is a block diagram illustrating an example computing environment.

FIG. 14 depicts a generalized example of a suitable computing environment 1400 in which the described innovations may be implemented. The computing environment 1400 is not intended to suggest any limitation as to scope of use or functionality, as the innovations may be implemented in diverse general-purpose or special-purpose computing systems. For example, the computing environment 1400 can be any of a variety of computing devices (e.g., desktop computer, laptop computer, server computer, tablet computer, smartphone, etc.).

With reference to FIG. 14, the computing environment 1400 includes one or more processing units, such as central processing unit (CPU) 1410 and graphics or co-processing unit 1415, and memory 1420, 1425. In FIG. 14, this basic configuration 1430 is included within a dashed line. The processing units 1410, 1415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 14 shows a central processing unit 110 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s). The memory 1420, 1425 stores software 1480 implementing one or more innovations described herein, in the form of computer-executable instructions suitable for execution by the processing unit(s).

A computing system may have additional features. For example, the computing environment 1400 includes storage 1440, one or more input devices 1450, one or more output devices 1460, and one or more communication connections 1470. An interconnection mechanism (not shown) such as a bus, controller, or network interconnects the components of the computing environment 1400. Typically, operating system software (not shown) provides an operating environment for other software executing in the computing environment 1400, and coordinates activities of the components of the computing environment 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing environment 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing environment 1400. The output device(s) 1460 may be a display, printer, speaker, CD-writer, or another device that provides output from the computing environment 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 15:
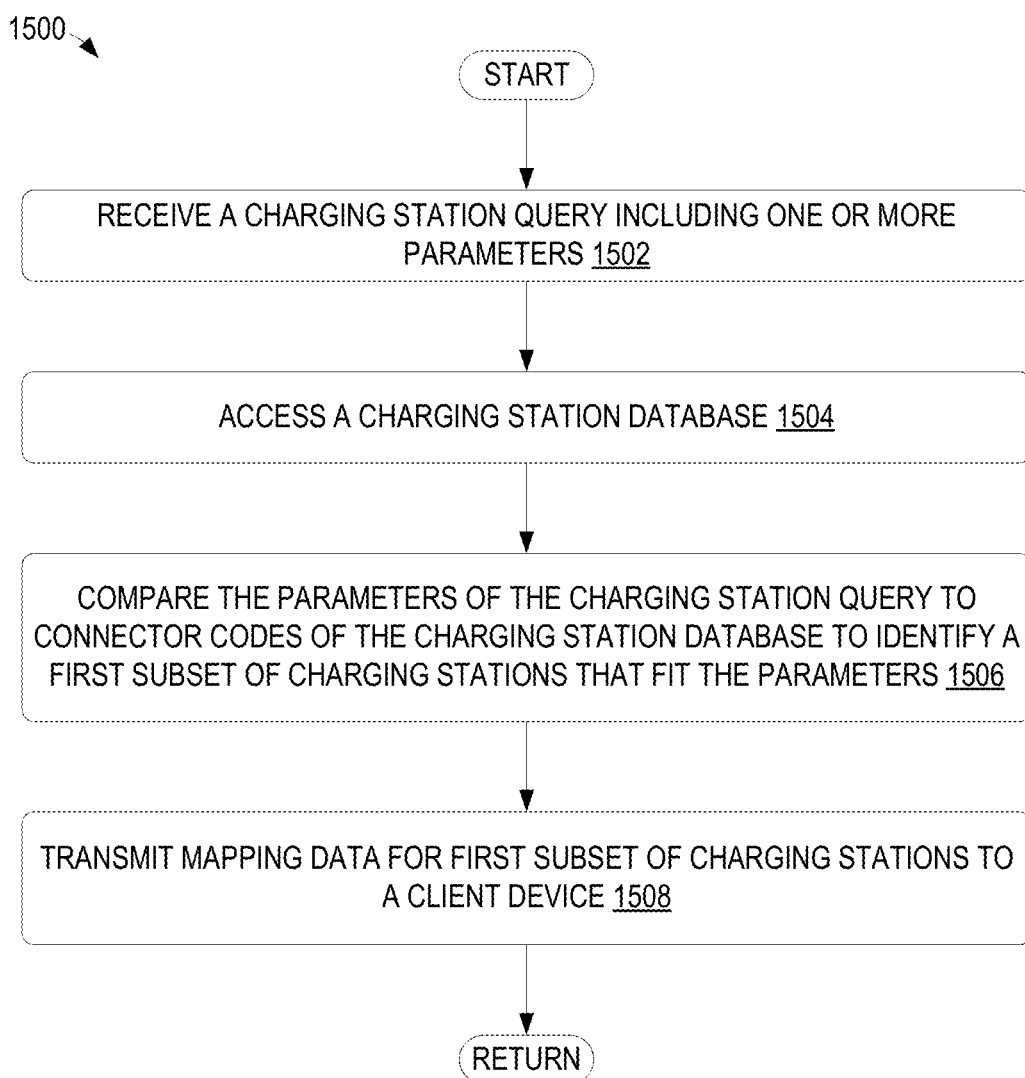
FIG. 15 is a flow chart illustrating an example method for identifying charging options for a user.

FIG. 15 shows an example method 1500 for identifying charging options for a user (e.g., for a driver or other user of an electric vehicle that submits a query). Method 1500 may be performed by any suitable computing device(s), such as the server 102 of FIG. 1. The execution of method 1500 may be one example of servicing charging station queries (e.g., as described at 210 of method 200 of FIG. 2). At 1502, the method includes receiving a charging station query including one or more parameters. Example charging station queries are described above in more detail with respect to FIGS. 5, 6, and 11. FIG. 8 shows example parameters that may be set for a charging station query.

At 1504, the method includes accessing a charging station database. The charging station database stores connector codes identifying a connector type and a connector power level for charging connectors provided at a plurality of charging stations. An example charging station database is described above with respect to charging station database 110 of FIG. 1, which may be generated and/or maintained as described above with respect to method 300 of FIG. 3. Example connector codes that may be used in the database are described with respect to index 400 of FIG. 4.

At 1506, the method includes comparing the parameters of the charging station query to the connector codes of the charging station database to identify a first subset of the plurality of charging stations that fit the parameters of the charging station query. Examples of parameter comparison are described above with respect to FIG. 5 (e.g., using a targeted connector code included in or derived from a charging query as a search key), FIG. 6 (e.g., using a connector code of a vehicle to identify charging stations that are compatible with connectors of the vehicle), and FIG. 11 (e.g., identifying compatible charging stations and candidate routes based on received information).

At 1508, the method includes transmitting mapping data for the first subset of the plurality of charging stations to a client device. Example operations of transmitting mapping data are described above with respect to FIGS. 5, 6, 9, and 11. Examples of displayed output corresponding to transmitted mapping data are described above with respect to FIGS. 7, 10, and 13.

FIG. 16 shows an example method 1600 for identifying charging options for an electric vehicle (e.g., charging options that are targeted for the electric vehicle). Method 1600 may be performed by any suitable computing device(s), such as the server 102 of FIG. 1. The execution of method 1600 may be one example of generating and/or maintaining a charging station database (e.g., as described at 202 and 204 of FIG. 2 and method 300 of FIG. 3) and servicing charging station queries (e.g., as described at 210 of method 200 of FIG. 2). At 1602, the method includes receiving, for a first set of charging stations, charging station data including connector types available at the charging stations of the first set and power outputs associated with the connector types. The charging station data may be received from one or more charging station data sources (e.g., charging station data sources 106 of FIG. 1), as described in more detail above with respect to FIGS. 2 and 3.

At 1604, the method includes converting the charging station data to standardized connector codes (e.g., as described in more detail above at 204 of FIG. 2 and method 300 of FIG. 3). Examples of the standardized connector codes are described above with respect to FIG. 4.

At 1606, the method includes determining connector codes for connectors that are adapted for the electric vehicle. Examples of determining connector codes for an electric vehicle are described at 504 and 506 of FIG. 5 and 612 of FIG. 6.

At 1608, the method includes generating a second set of charging stations by selecting the connector codes available at the charging stations of the first set that are compatible with the connectors adapted for the electric vehicle (e.g., as described at 510 of FIG. 5 and 615 of FIG. 6). Additional examples of identifying compatible charging stations (e.g., charging stations with connectors having connector codes that are compatible with a connector of the electric vehicle) are described at 906/908 of FIG. 9 and 1104 of FIG. 11.

At 1610, the method includes generating for display, on a client device, mapping data for a map showing locations of the charging stations of the second set relative to a current position of the electric vehicle. Example operations of generating mapping data are described above with respect to FIGS. 5, 6, 9, and 11. Examples of displayed output corresponding to generated mapping data are described above with respect to FIGS. 7, 10, and 13.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

I claim:

1. A method of identifying charging options for a user, the method comprising:
   receiving a charging station query including one or more parameters;
   accessing a charging station database, the charging station database storing connector codes identifying a connector type and a connector power level for charging connectors provided at a plurality of charging stations;
   comparing the one or more parameters of the charging station query to the connector codes of the charging station database to identify a first subset of the plurality of charging stations that fit the one or more parameters of the charging station query;
   determining additional parameters including one or more targeted connector codes associated with a charging connector adapter for an electric vehicle;
   identifying a second subset of the plurality of charging stations that fit the additional parameters using the additional targeted connector codes as a search key;
   transmitting mapping data for the first subset of the plurality of charging stations to a client device; and
   transmitting additional mapping data for the second subset of the plurality of charging stations to the client device responsive to receiving an indication of user input requesting a view of charging stations that are compatible with the charging connector adapter.

2. The method of claim 1, wherein the one or more parameters of the charging station query include vehicle information associated with the vehicle, and wherein a connector code for the vehicle is derived from the vehicle information.

3. The method of claim 1, wherein the one or more parameters of the charging station query include one or more connector codes of interest that are selected by the user via a user interface of the client device.

4. The method of claim 1, wherein the mapping data includes a list of geolocations for the first subset of the plurality of charging stations and an indication of one or more connector codes and connector code counts for each charging station of the first subset, the connector code counts indicating a quantity of connectors associated with each connector code at each charging station of the first subset.

5. The method of claim 1, further comprising receiving updated locations of a vehicle associated with the user as the vehicle travels along a route and iteratively servicing additional charging station queries, wherein servicing the additional charging station queries includes, for each additional charging station query:
   identifying a new subset of the plurality of charging stations that includes charging stations within a threshold distance of the vehicle and that fit the one or more parameters of the additional charging station query, and
   transmitting updated mapping data corresponding to the new subset of the plurality of charging stations to the client device.

6. The method of claim 1, wherein the charging station query includes a starting location, a destination, and an indication of at least one targeted connector code, and wherein the method further comprises determining a route between the starting location and the destination that includes one or more charging stations that is compatible with the at least one targeted connector code.

7. The method of claim 1, wherein the one or more parameters of the charging station query include a target charge level for charging a vehicle.

8. A system for identifying charging options according to a charging query, the system comprising:
   a communication interface connecting the system to one or more charging station data sources;
   a database of charging stations mapping charging connectors of the charging stations to associated standardized connector codes, the standardized connector codes indicating, for each of the charging stations, a connector type, a connector power level, and a connector count available at the charging stations;

a processor; and a storage device storing instructions executable by the processor to:
- update the database by performing additional mapping of charging connectors of the charging stations to associated standardized connector codes based on periodically-received data from the one or more charging station data sources;
- receive the charging station query from a user of a client device;
- compare parameters of the charging station query to the connector codes of the database to identify a first set of charging stations that fit the parameters of the charging station query;
- determine a targeted connector code associated with a charging connector adapter for the electric vehicle;
- determine a second set of charging stations that fit the parameters of the charging station query using the targeted connector code as a search key;
- transmit, to the client device, mapping data corresponding to the first set of charging stations; and
- transmit, to the client device, additional mapping data corresponding to the second set of charging stations responsive to receiving an indication of user input requesting a view of charging stations that are compatible with the charging connector adapter.

9. The system of claim 8, wherein the targeted connector code comprises a first targeted connector codes, wherein the search key comprises a first search key, wherein the charging station query includes a second targeted connector codes, and wherein comparing the parameters of the charging station query to the connector codes of the database includes searching the database using the second targeted connector code as a second search key.

10. The system of claim 8, wherein the targeted connector code comprises a first targeted connector codes, wherein the search key comprises a first search key, wherein the charging station query includes vehicle information of an electric vehicle associated with the user, and wherein the instructions are further executable to:
- determine a connector type and a connector power level for the electric vehicle based on the vehicle information, and
- convert the connector type and the connector power level for the electric vehicle to a second targeted connector code for comparison to the database; and
- wherein comparing the parameters of the charging station query to the connector codes of the database includes searching the database using the second targeted connector code as a second search key to determine the first set of charging stations that fit the parameters of the charging station query.

11. A method of identifying charging options for a user, the method comprising:
- receiving a charging station query including parameters;
- accessing a charging station database, the charging station database storing connector codes identifying a connector type and a connector power level for charging connectors provided at a plurality of charging stations;
- comparing the parameters of the charging station query to the connector codes of the charging station database to identify a first subset of the plurality of charging stations that fit the parameters of the charging station query;
- transmitting mapping data for the first subset of the plurality of charging stations to a client device; and
- receiving updated locations of a vehicle associated with the user as the vehicle travels along a route and iteratively servicing additional charging station queries having respective parameters, wherein servicing the additional charging station queries includes, for each additional charging station query:
  - identifying a new subset of the plurality of charging stations that includes charging stations within a threshold distance of the vehicle and that fit the respective parameters of the additional charging station query, and
  - transmitting updated mapping data corresponding to the new subset of the plurality of charging stations to the client device.

* * * * *